US008933649B2

(12) United States Patent
Matthews et al.

(10) Patent No.: US 8,933,649 B2
(45) Date of Patent: Jan. 13, 2015

(54) POWER CONVERTER HAVING A SWITCH COUPLED BETWEEN WINDINGS

(75) Inventors: David Michael Hugh Matthews, Windsor (GB); Matteo Uccelli, Milan (IT)

(73) Assignee: Power Integrations, Inc., San Jose, CA (US)

( * ) Notice: Subject to any disclaimer, the term of this patent is extended or adjusted under 35 U.S.C. 154(b) by 437 days.

(21) Appl. No.: 12/790,412

(22) Filed: May 28, 2010

(65) Prior Publication Data

US 2011/0156675 A1 Jun. 30, 2011

Related U.S. Application Data

(63) Continuation-in-part of application No. 12/648,003, filed on Dec. 28, 2009.

(51) Int. Cl.
H05B 37/02 (2006.01)
H02M 3/155 (2006.01)

(52) U.S. Cl.
CPC .................................. H02M 3/155 (2013.01)
USPC ............................ 315/362; 315/297; 315/307

(58) Field of Classification Search
USPC .......... 315/177, 185 R, 186, 193, 209 R, 219, 315/224, 225, 291, 306, 307, 308, 362
See application file for complete search history.

(56) References Cited

U.S. PATENT DOCUMENTS

| 3,679,953 A | 7/1972 | Bedford |
| 4,184,197 A * | 1/1980 | Cuk et al. ........................ 363/16 |
| 5,747,972 A | 5/1998 | Baretich et al. |
| 6,853,563 B1 | 2/2005 | Yang et al. |
| 6,862,194 B2 | 3/2005 | Yang et al. |
| 7,038,399 B2 | 5/2006 | Lys et al. |

(Continued)

FOREIGN PATENT DOCUMENTS

| AT | 409568 B | 9/2002 |
| CN | 101364374 A | 2/2009 |

(Continued)

OTHER PUBLICATIONS

Cathell, Frank, "AND8318/D, Offline Buck Converter with Tapped Inductor Offers Improved Performance", Publication Order No. AND8318/D, Jan. 2008—Rev. 0, 4 pages, Semiconductor Components Industries, LLC.

(Continued)

*Primary Examiner* — Thienvu Tran
*Assistant Examiner* — Christopher Lo
(74) *Attorney, Agent, or Firm* — Blakely Sokoloff Taylor & Zafman LLP

(57) ABSTRACT

An example power converter includes a first winding, a second winding, a switch, a controller and an output circuit. The second winding is magnetically coupled to the first winding and the controller includes a feedback terminal and a common terminal. The controller is coupled to control the switch to regulate an output of the power converter in response to a feedback voltage received at the feedback terminal. The output circuit is coupled between the common terminal of the controller and a common reference of the power converter to provide an output voltage to a load. The feedback voltage is a positive voltage with respect to the common terminal and the output voltage is a negative voltage with respect to the common reference of the power converter.

29 Claims, 13 Drawing Sheets

(56) References Cited

U.S. PATENT DOCUMENTS

| | | | |
|---|---|---|---|
| 7,310,244 | B2 | 12/2007 | Yang et al. |
| 7,535,207 | B2 | 5/2009 | Darroman |
| 7,564,229 | B2 | 7/2009 | Odell |
| 2002/0118000 | A1 | 8/2002 | Xu et al. |
| 2004/0113736 | A1 | 6/2004 | Schimel |
| 2005/0162872 | A1* | 7/2005 | Hirabayashi et al. ........... 363/19 |
| 2006/0006813 | A1 | 1/2006 | Van Casteren |
| 2007/0171682 | A1* | 7/2007 | Yang et al. ...................... 363/20 |
| 2009/0001955 | A1* | 1/2009 | Yoshida ........................ 323/282 |
| 2009/0251061 | A1 | 10/2009 | Siessegger |
| 2011/0194317 | A1* | 8/2011 | Truettner et al. .......... 363/21.18 |

FOREIGN PATENT DOCUMENTS

| | | |
|---|---|---|
| DE | 1588671 A1 | 5/1970 |
| DE | 2842262 A1 | 4/1979 |
| DE | 3628138 A1 | 2/1988 |
| DE | 10 2007 028 077 A1 | 12/2008 |

OTHER PUBLICATIONS

"NCP1010, NCP1011, NCP1012, NCP1013, NCP1014, Self-Supplied Monolithic Switcher for Low Standby-Power Offline SMPS", Publication Order No. NCP1010/D, Nov. 2008—Rev. 20, 24 pages, Semiconductor Components Industries, LLC.

Grant, D. et al., "Synthesis of Tapped-Inductor Switched-Mode Converters," IEEE Transactions on Power Electronics, Sep. 2007, pp. 1964-1969, vol. 22, No. 5.

U.S. Appl. No. 12/648,003, Non-Final Office Action, mailed Jun. 6, 2012.

CN 201010621584.6—First Office Action with English Translation, issued Mar. 1, 2013 (21 pages).

CN 201010621584.6—First Office Action, issued Mar. 1, 2013 (10 pages).

U.S. Appl. No. 12/648,003, filed Dec. 28, 2009—Notice of Allowance mailed Mar. 25, 2013 (10 pages).

DE 10 2010 056 332.3, German Office Action, mailed Feb. 5, 2013 (8 pages).

U.S. Appl. No. 12/648,003, Final Office Action, mailed Nov. 1, 2012 (13 pages).

U.S. Appl. No. 12/648,003, filed Dec. 28, 2009—Notice of Allowance, mailed Jun. 7, 2013 (10 pages).

CN 201010621584.6—Second Office Action and Search Report with English Translation, issued Dec. 16, 2013 (15 pages).

* cited by examiner

POWER CONVERTER HAVING A SWITCH COUPLED BETWEEN WINDINGS

REFERENCE TO PRIOR APPLICATIONS

This application is a continuation-in-part of U.S. Non-Provisional application Ser. No. 12/648,003, filed Dec. 28, 2009, hereby incorporated by reference.

TECHNICAL FIELD

This disclosure relates generally to power converter, and in particular but not exclusively, relates to ac-dc power converters.

BACKGROUND INFORMATION

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. A typical switching power supply also comprises a switch coupled to the energy transfer element and a power supply control circuit coupled to the switch. The switched mode power supply control circuit usually regulates an output voltage of the power supply, output current of the power supply, or a combination of the two by sensing the output and controlling it in a closed loop. In operation, the switch is utilized to provide the desired output by varying the duty cycle (typically the ratio of the on-time of the switch to the total switching period) of the switch in a switched mode power supply.

A buck converter is one type of switching power supply where the duty cycle is substantially the ratio of the output voltage of the switching power supply to the input voltage when operating in continuous current mode. As such the ratio of the on-time and the off-time of the switch determines the output voltage. For loads which require a small output voltage in comparison to the input voltage, the duty cycle of the buck converter is small and as a result the on-time of the switch is small in comparison to the total switching period. For example, a power supply with an output voltage of 12 V from a rectified ac input voltage of 375 V would require an on-time which is 3.2% of the total switching period. For such cases, a tapped buck converter can provide the same output voltage to input voltage ratio as a buck converter but with a larger switch duty cycle. A larger switch duty cycle is desirable to reduce losses in the switch (typically a MOSFET, bipolar transistor or the like) that is coupled to the energy transfer element of the power supply In a typical tapped buck converter configuration one end of an inductor is coupled to the switch, while the other end of the inductor is coupled to the output. A freewheeling diode is then coupled to a tap included in the inductor. A circuit may also be included in the switching power supply to provide a feedback signal that is representative of the output of the switching power supply. This feedback signal may then be used by the power supply control circuit to control the switching of the switch to regulate the output of the switching power supply. However, since the power supply output and power supply control circuit are referenced to different voltage levels in a tapped buck converter, the feedback signal needs to be level shifted in order to interface with the control circuit. Thus, the typical tapped buck converter configuration may include additional and relatively expensive circuitry for level shifting the feedback signal in this way. For example, a conventional tapped buck converter configuration may include an optocoupler or bias winding coupled between the output of the switching power supply and the power supply control circuit to level shift the feedback signal.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a power converter having a switch coupled between windings are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A switch that is in an OFF state, also referred to as being an open switch, is a switch that is in a condition in which the switch does not conduct current. A switch that is in an ON state, also referred to as being a closed switch, is a switch that is in a condition in which the switch may conduct current.

Embodiments of the present invention include a power converter having magnetically coupled windings with a switch coupled between the windings. Having the switch coupled between the windings allows for the direct measurement of an output of the power converter for feedback information without the need for additional and expensive level shifting components typically included in conventional power supply circuits. One embodiment of the present invention is a power supply supplying power to LED lamps where the current flowing in the LED lamp needs to be regulated. By positioning the switch and a control circuit coupled to drive the switch between the magnetically coupled windings of an energy transfer element, it is possible to generate a feedback signal representative of the current flowing in the LED lamp without the need to level shift the feedback signal. The feedback signal can therefore be directly coupled to the controller to provide a low cost power supply implementation. These and other embodiments are described in detail below.

Figure 1A:
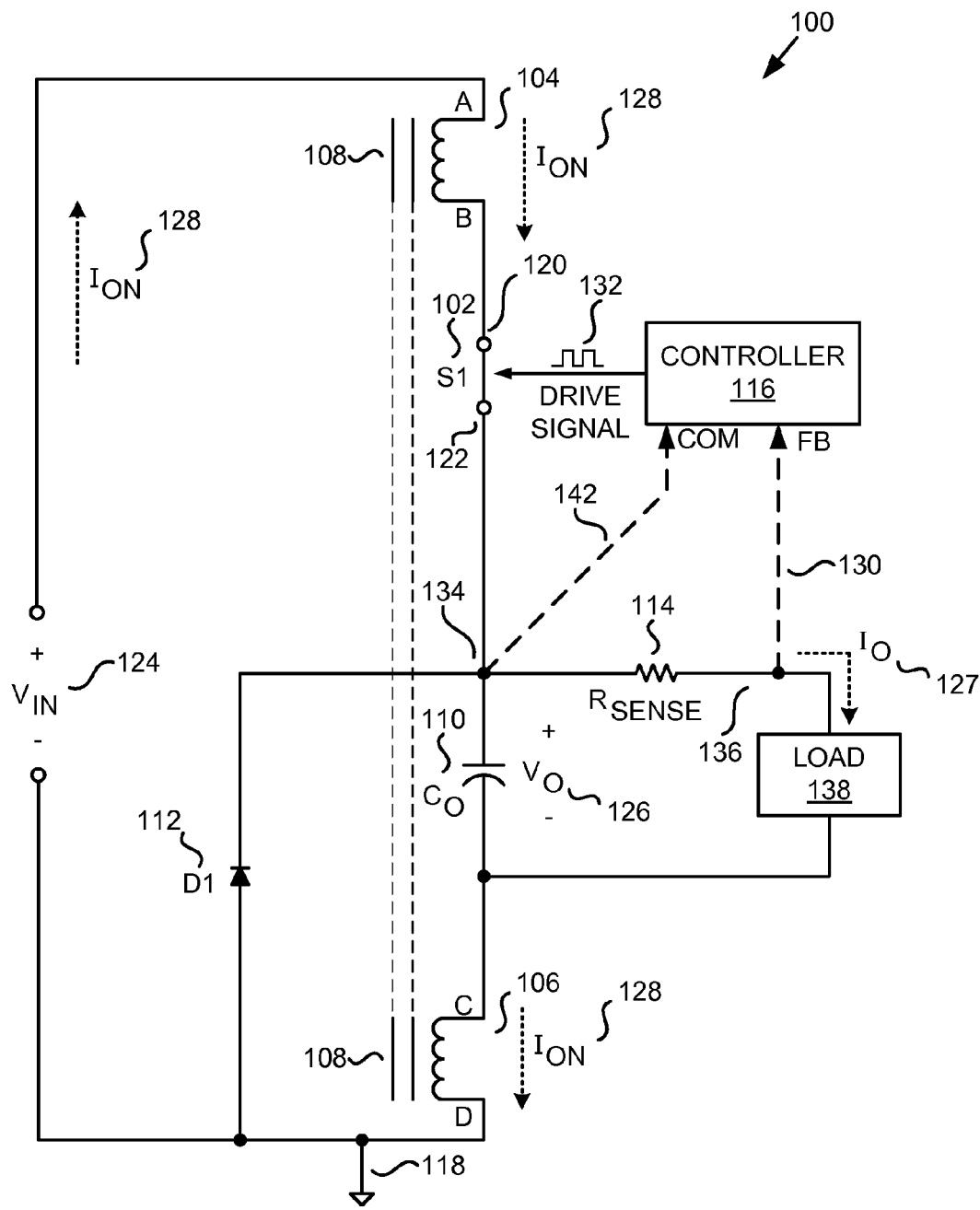
FIG. 1A is a schematic diagram illustrating a power converter having a switch in an ON state, in accordance with an embodiment of the invention.

FIG. 1A is a schematic diagram illustrating a power converter 100 having a switch S1 102 in an ON state, in accordance with an embodiment of the invention. Power converter 100 is illustrated as including switch S1 102, a first winding 104, a second winding 106, a core 108, an output capacitor $C_O$ 110, a diode D1 112, a sense circuit 114, a controller 116 and a common reference 118. First winding 104 is illustrated as including terminals A and B, while second winding 106 is illustrated as including terminals C and D. Switch S1 102 is illustrated as including terminals 120 and 122. Also shown in FIG. 1A are an input voltage $V_{IN}$ 124, an output voltage $V_O$ 126, an output current $I_O$ 127, a current $I_{ON}$ 128, a feedback signal 130, a drive signal 132, a reference node 134, a node 136, and a load 138.

As shown in FIG. 1A, first winding 104 is magnetically coupled to second winding 106 by way of core 108. That is, core 108 is common to both first winding 104 and to second winding 106. In one embodiment, first winding 104 and second winding 106 are first and second portions, respectively, of a main inductor. Thus, a main inductor included in power converter 100 may include a wire wound around a single core, where the wire has been separated into first and second portions corresponding to first winding 104 and second winding 106, respectively. In one embodiment, core 108 includes a ferromagnetic material.

Terminal A of first winding 104 is illustrated as being coupled to receive input voltage $V_{IN}$ 124. In one embodiment, power converter 100 is an ac-dc power converter where input voltage $V_{IN}$ 124 is a dc voltage that has been generated by rectifying and filtering an ac input voltage. Power converter 100 may optionally include rectifier and filter circuits (not shown) coupled to provide input voltage $V_{IN}$ 124 to terminal A of first winding 104.

Switch S1 102 is illustrated as being coupled between first winding 104 and second winding 106. More particularly, FIG. 1A illustrates terminal 120 of switch S1 102 as being coupled to terminal B of first winding 104, while terminal 122 of switch S1 102 is coupled to reference node 134. In one embodiment, switch S1 102 is coupled such that current $I_{ON}$ 128 flows through first winding 104, through switch S1 102 and through second winding 106 when switch S1 is in an ON state (i.e., closed). Switch S1 102 may be implemented as a semiconductor device such as for example a metal oxide semiconductor field effect transistor (MOSFET), a bipolar junction transistor (BJT), or an insulated gate bipolar transistor (IGBT).

Controller 116 is coupled to provide drive signal 132 to control switch S1 102 to regulate an output of power converter 100. The regulated output is generally in the form of a regulated voltage (e.g., output voltage $V_O$ 126), current (e.g., output current $I_O$ 127), output power or some combination thereof. Controller 116 regulates the output by controlling switch S1 102 to turn on and off in response to feedback signal 130. In the example, feedback signal 130 is representative of output current $I_O$ 127. In other examples a feedback signal could be representative of output voltage 126, output power or some combination thereof. Controller 116 may be implemented as a monolithic integrated circuit, or with discrete electrical components or a combination of discrete and integrated components. Controller 116 and switch S1 102 could form part of an integrated control circuit that is manufactured as either a hybrid or a monolithic integrated circuit.

FIG. 1A further illustrates output capacitor $C_O$ 110 as coupled between first winding 104 and second winding 106. More particularly, the output capacitor $C_O$ 110 is coupled to reference node 134 and to terminal C of second winding 106. In the illustrated embodiment, the output capacitor $C_O$ 110 filters the output of the power converter 100 to provide a substantially constant output voltage $V_O$ 126 or output current $I_O$ 127. As shown, the output voltage $V_O$ 126 is the voltage across output capacitor $C_O$ 110.

Second winding 106 is illustrated in FIG. 1A as being coupled between output capacitor $C_O$ 110 and common reference 118. More particularly, terminal C of second winding 106 is coupled to output capacitor $C_O$ 110 while terminal D is coupled to common reference 118. As mentioned above in one embodiment, a current (i.e., current $I_{ON}$ 128) flows through second winding 106, which is substantially the same as the current that flows through first winding 104 and switch S1 102 when switch S1 102 is in the ON state.

Figure 1B:
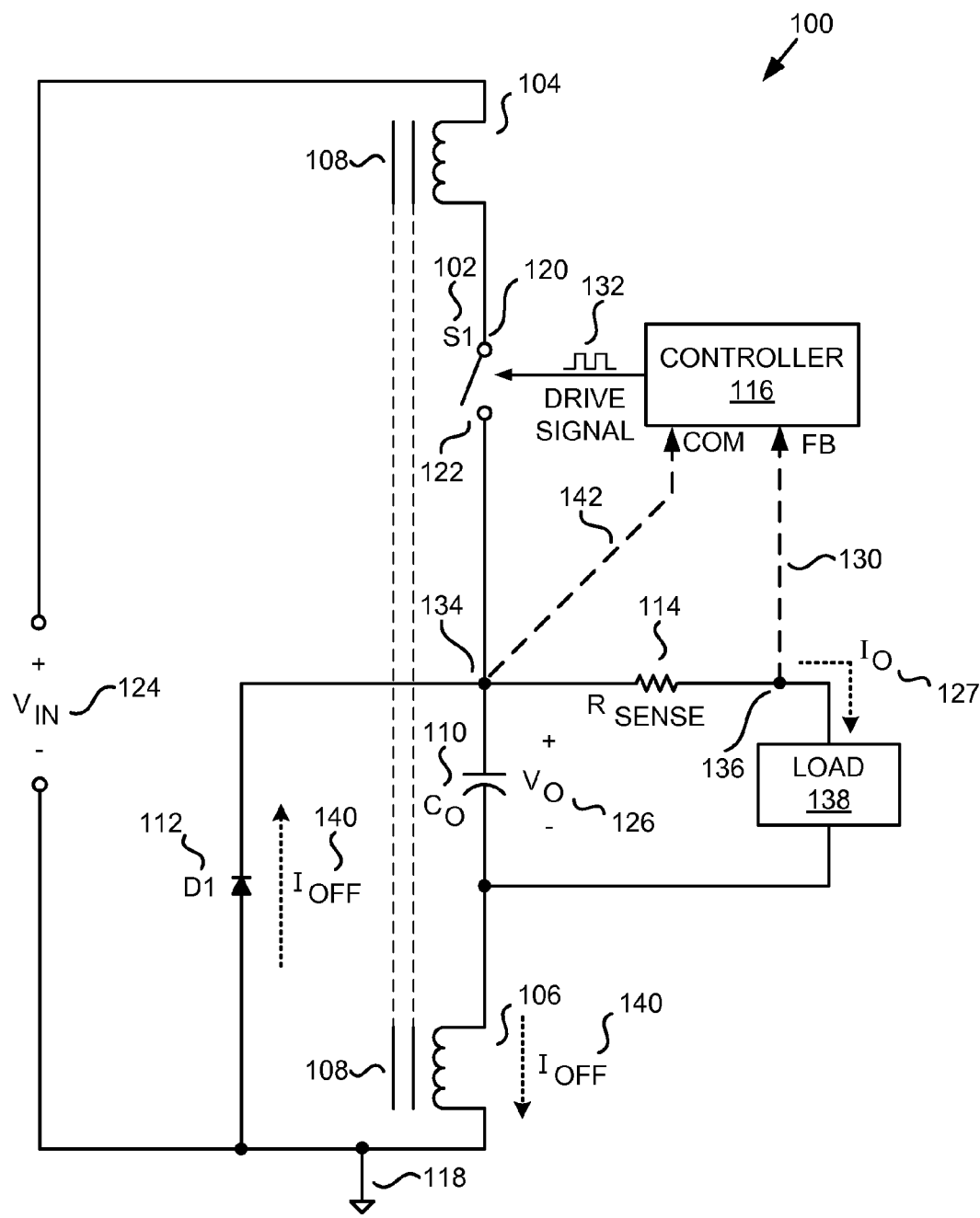
FIG. 1B is a schematic diagram illustrating the power converter of FIG. 1A with the switch in an OFF state.

Diode D1 112 is illustrated as being coupled between reference node 134 and common reference 118. More particularly, an anode of diode D1 112 may be coupled to common reference 118, while a cathode of diode D1 112 is coupled to reference node 134 to provide a path for the current from second winding 106 when switch S1 102 is in the OFF state. For example, FIG. 1B is a schematic diagram illustrating power converter 100 of FIG. 1A when switch S1 102 in the OFF state. As shown in FIG. 1B, during operation, controller 116 switches switch S1 102 to the OFF state, thereby substantially preventing current from flowing through first winding 104 and through switch S1 102. However, as illustrated in FIG. 1B, a current (i.e., current $I_{OFF}$ 140) flows through second winding 106, which is substantially the same as the current that flows through diode D1 112 when switch S1 102 is in the OFF state.

Referring now to both FIGS. 1A and 1B, power converter 100 may include a sense circuit 114 coupled to provide feedback signal 130 to controller 116. The feedback signal 130 may be a voltage signal or a current signal. While FIGS. 1A and 1B illustrate sense circuit 114 as including a sense resistor $R_{SENSE}$, sense circuit 114 may include discrete, active or a combination of discrete and active components in accordance with the teachings of the present invention. In one embodiment sense resistor R$_{SENSE}$ is coupled to load 138. That is, sense resistor R$_{SENSE}$ may be coupled to load 138 without isolation circuitry therebetween. As shown in FIGS. 1A and 1B, sense circuit 114 is further coupled between switch S1 102 and controller 116 to provide the feedback signal 130, which in one example is representative of output current I$_O$ 127. More particularly, sense circuit 114 is coupled between reference node 134 and node 136. In one embodiment, sense circuit 114 generates feedback signal 130 in response to a voltage taken with respect to reference node 134. However, reference node 134 may be directly connected (i.e., electrically shorted) to terminal 122 of switch S1 102. Thus, sense circuit 114 may generate feedback signal 130 in response to a voltage taken with respect to terminal 122 of switch S1 102. Sense circuit 114 may also, in one embodiment, generate feedback signal 130 in response to a voltage across sense resistor R$_{SENSE}$. In one example reference node 134 is connected to a common terminal COM of controller 116 by way of optional connection 142 as the reference ground of the controller 116. In one example the reference ground (e.g., common terminal COM) of the controller 116 is the reference voltage level relative to which drive signal 132 is generated and feedback signal 130 is sensed. Therefore, embodiments of the present invention may include the feedback signal 130 generated across sense circuit 114 also relative to reference node 134.

In one embodiment, controller 116 includes a feedback terminal FB that is coupled to node 136. When the feedback signal 130 is a voltage signal, the feedback signal 130 received at the feedback terminal is a negative voltage with respect to terminal 122 of switch S1 102. The sense circuit 114 provides the feedback signal 130 which is representative of the output current I$_O$ 127, output voltage V$_O$ 126, or a combination of the two. For the embodiment shown in FIGS. 1A and 1B, the feedback signal 130 provides information regarding the output current I$_O$ 127 of the power converter 100 during both the ON state and the OFF state of switch S1 102.

Figure 2A:
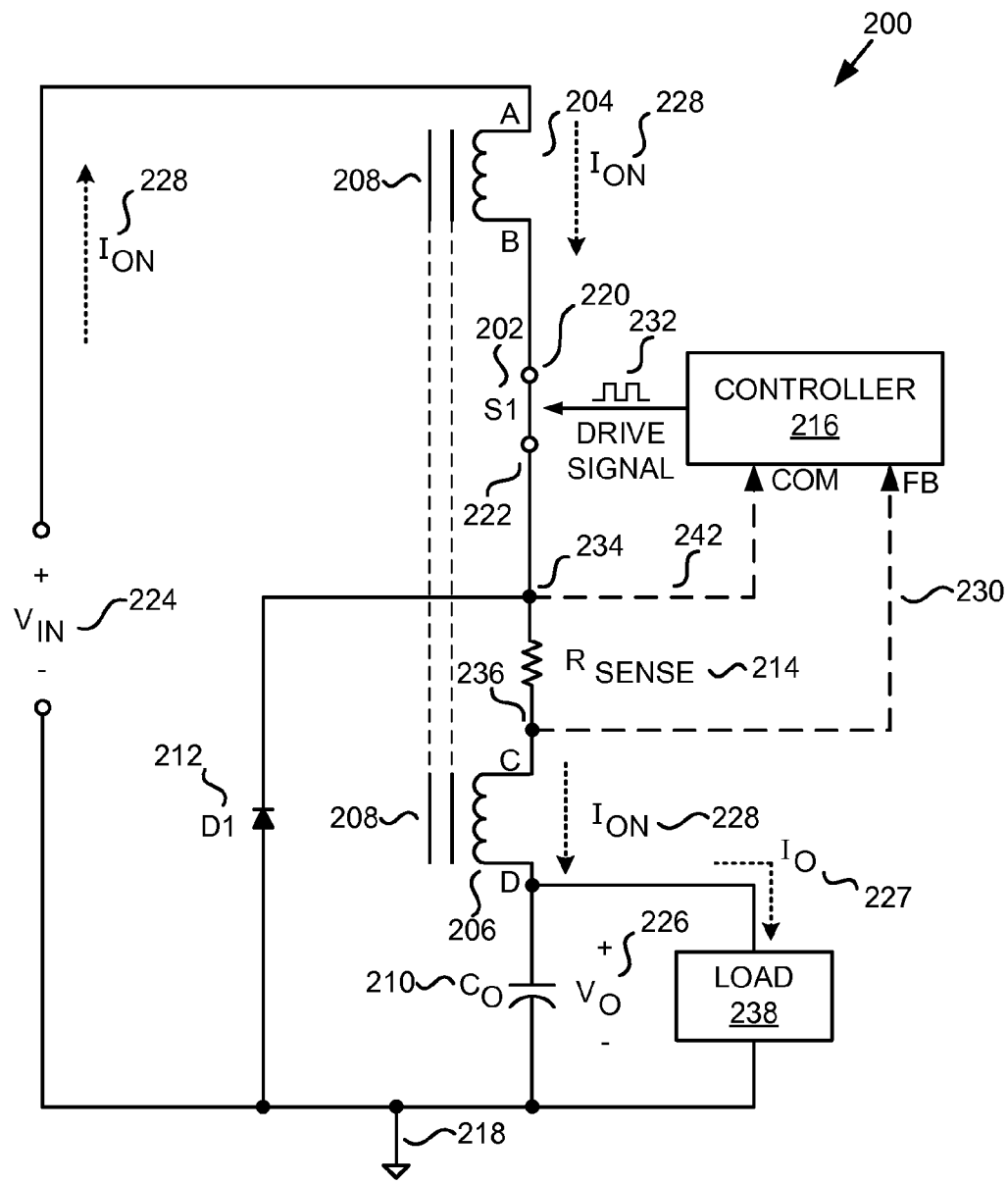
FIG. 2A is a schematic diagram illustrating a power converter having a switch in an ON state, in accordance with an embodiment of the invention.

FIG. 2A is a schematic diagram illustrating a power converter 200 having a switch S1 202 in an ON state, in accordance with an embodiment of the present invention. Power converter 200 is illustrated as including switch S1 202, a first winding 204, a second winding 206, a core 208, an output capacitor C$_O$ 210, a diode D1 212, a sense circuit 214, a controller 216 and a common reference 218. First winding 204 is illustrated as including terminals A and B, while second winding 206 is illustrated as including terminals C and D. Switch S1 202 is illustrated as including terminals 220 and 222. Also shown in FIG. 2A are an input voltage V$_{IN}$ 224, an output voltage V$_O$ 226, an output current I$_O$ 227, a current I$_{ON}$ 228, a feedback signal 230, a drive signal 232, a reference node 234, a node 236, and a load 238.

As shown in FIG. 2A, first winding 204 is magnetically coupled to second winding 206 by way of core 208. That is, core 208 is common to both first winding 204 and to second winding 206. In one embodiment, first winding 204 and second winding 206 are first and second portions, respectively, of a main inductor. Thus, a main inductor included in power converter 200 may include a wire wound around a single core, where the wire has been separated into first and second portions corresponding to first winding 204 and second winding 206, respectively. In one embodiment, core 208 includes a ferromagnetic material.

Terminal A of first winding 204 is illustrated as being coupled to receive input voltage V$_{IN}$ 224. In one embodiment, input voltage V$_{IN}$ 224 is a rectified and filtered ac voltage. Power converter 200 may optionally include rectifier and filter circuits (not shown) coupled to provide input voltage V$_{IN}$ 224 to terminal A of first winding 204.

Switch S1 202 is illustrated as being coupled between first winding 204 and second winding 206. FIG. 2A illustrates terminal 220 of switch S1 202 as being coupled to terminal B of first winding 204, while terminal 222 of switch S1 204 is coupled to reference node 234. In one embodiment, switch S1 202 is coupled such that current I$_{ON}$ 228 flows through first winding 204, through switch S1 202 and through second winding 206 when the switch S1 202 is in an ON state (i.e., closed). Switch S1 202 may be implemented as a semiconductor device such as a metal oxide semiconductor field effect transistor (MOSFET), a bipolar junction transistor (BJT), or an insulated gate bipolar transistor (IGBT).

Controller 216 is shown in FIG. 2A as being coupled to provide drive signal 232 to control the switching of the switch S1 202 to regulate an output of power converter 200. The regulated output is generally in the form of regulated voltage (e.g., output voltage V$_O$ 226), current (e.g., output current I$_O$ 227), output power or some combination thereof. Controller 216 regulates the output by controlling switch S1 202 to turn on and off in response to feedback signal 230. Feedback signal 230 may be representative of output voltage V$_O$ 226, output current I$_O$ 227, output power or some combination thereof. Controller 216 may be implemented as a monolithic integrated circuit, may be implemented with discrete electrical components or may be implemented as a combination of discrete and integrated components. Controller 216 and switch S1 202 could form part of an integrated control circuit that is manufactured as either a hybrid or a monolithic integrated circuit.

Second winding 206 is illustrated in FIG. 2A as being coupled between sense circuit 214 and output capacitor C$_O$ 210. FIG. 2A illustrates terminal C of second winding 206 as being coupled to sense circuit 214 while terminal D is coupled to output capacitor C$_O$ 210. As mentioned above, a current (i.e., current I$_{ON}$ 228) flows through the second winding 206 which is substantially the same as the current that flows through first winding 204 and switch S1 202 when switch S1 202 is in the ON state.

FIG. 2A further illustrates output capacitor C$_O$ 210 as coupled between second winding 206 and common reference 218. In the illustrated embodiment, the output capacitor C$_O$ 210 filters the output of the power converter 200 to provide a substantially constant output voltage V$_O$ 226 or output current I$_O$ 227. As shown, the output voltage V$_O$ 226 is the voltage across output capacitor C$_O$ 210

Figure 2B:
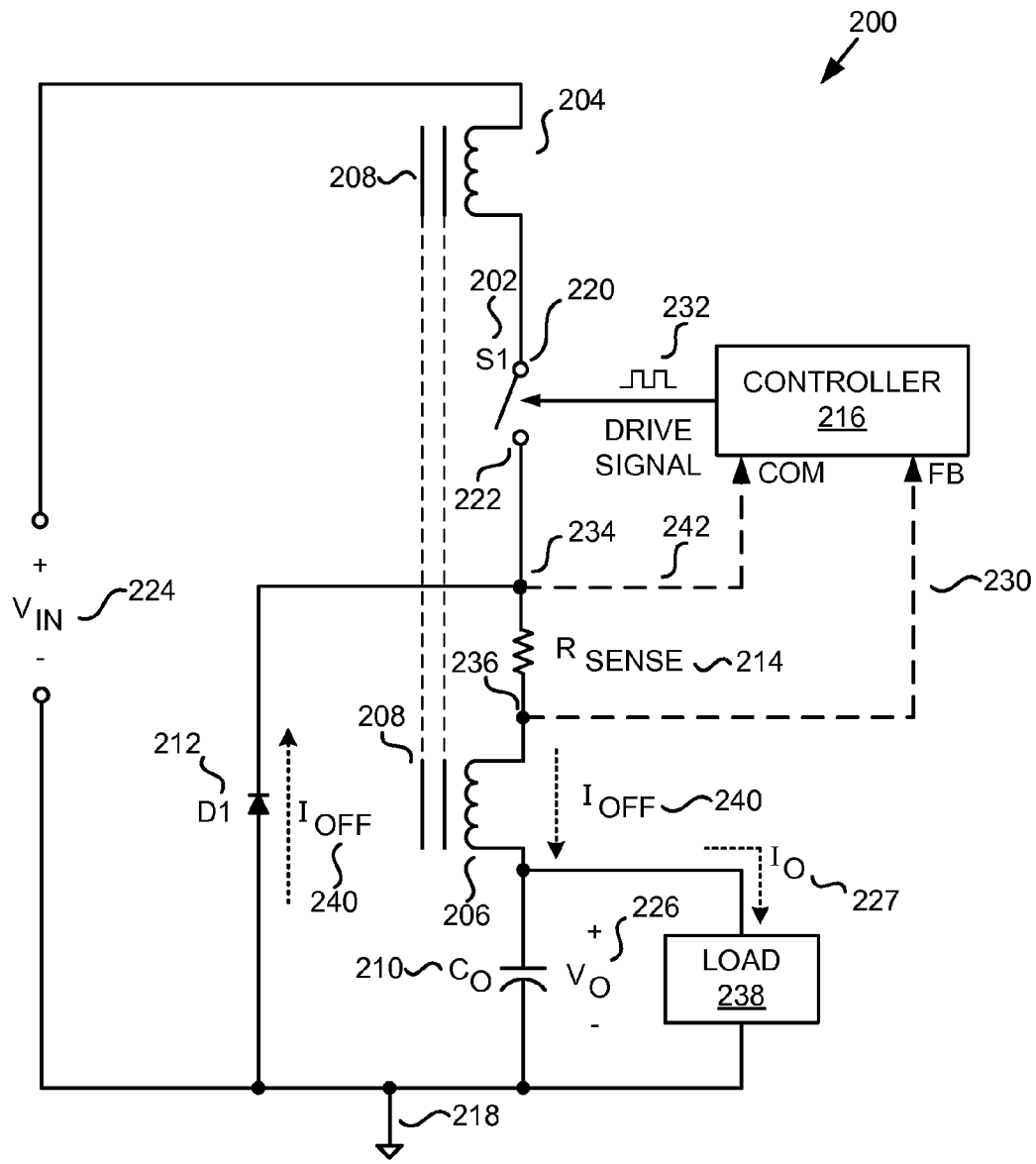
FIG. 2B is a schematic diagram illustrating the power converter of FIG. 2A with the switch in an OFF state.

Diode D1 212 is illustrated as being coupled between reference node 234 and common reference 218. More particularly, an anode of diode D1 212 may be coupled to common reference 218, while a cathode of diode D1 212 is coupled to reference node 234 to provide a path for current to flow from the second winding 206 when switch S1 202 is in the OFF state. For example, FIG. 2B is a schematic diagram illustrating power converter 200 of FIG. 2A with switch S1 202 in the OFF state. As shown in FIG. 2B, during operation, controller 216 switches switch S1 202 to the OFF state, thereby substantially preventing current from flowing through first winding 204 and through switch S1 202. However, as illustrated in FIG. 2B, a current (i.e., current I$_{OFF}$ 240) flows through second winding 206, which is substantially the same as the current that flows through diode D1 212 when switch S1 202 is in the OFF state.

Referring now to both FIGS. 2A and 2B, power converter 200 may include a sense circuit 214 coupled to provide feedback signal 230 to controller 216. Although FIGS. 2A and 2B illustrate sense circuit 214 as including a sense resistor $R_{SENSE}$, sense circuit 214 may include discrete, active or a combination of discrete and active components in accordance with the teachings of the present invention. In one embodiment sense resistor $R_{SENSE}$ includes one terminal coupled to reference node 234 and another terminal coupled to terminal C of second winding 206. As shown in FIGS. 2A and 2B, sense circuit 214 is further coupled between switch S1 202 and controller 216 to provide the feedback signal 230, which in one example is representative of output current $I_O$ 227. In one embodiment, sense circuit 214 generates feedback signal 230 in response to a voltage taken with respect to reference node 234. However, reference node 234 may be directly connected (i.e., electrically shorted) to terminal 222 of switch S1 202. Thus, sense circuit 214 may generate feedback signal 230 in response to a voltage taken with respect to terminal 222 of switch S1 202. Sense circuit 214 may also, in one embodiment, generate feedback signal 230 in response to a voltage across sense resistor $R_{SENSE}$. In one example reference node 234 is connected to a common terminal COM of controller 216 by way of optional connection 242 as the reference ground of the controller 216. In one example the reference ground (e.g., common terminal COM) of the controller 216 is the reference voltage level relative to which drive signal 232 is generated and feedback signal 230 is sensed. Therefore, embodiments of the present invention may include the feedback signal 230 generated across sense circuit 214 also relative to reference node 234.

In one embodiment, controller 216 includes a feedback terminal FB which is coupled to node 236 and thus feedback signal 230 has a negative voltage with respect to terminal 222 of switch S1 202 and node 234. Furthermore, in the illustrated embodiment of FIGS. 2A and 2B, sense circuit 214 provides feedback signal 230 which is representative of the output of power converter 200 during both the ON state and the OFF state of switch S1 202.

Figure 3A:
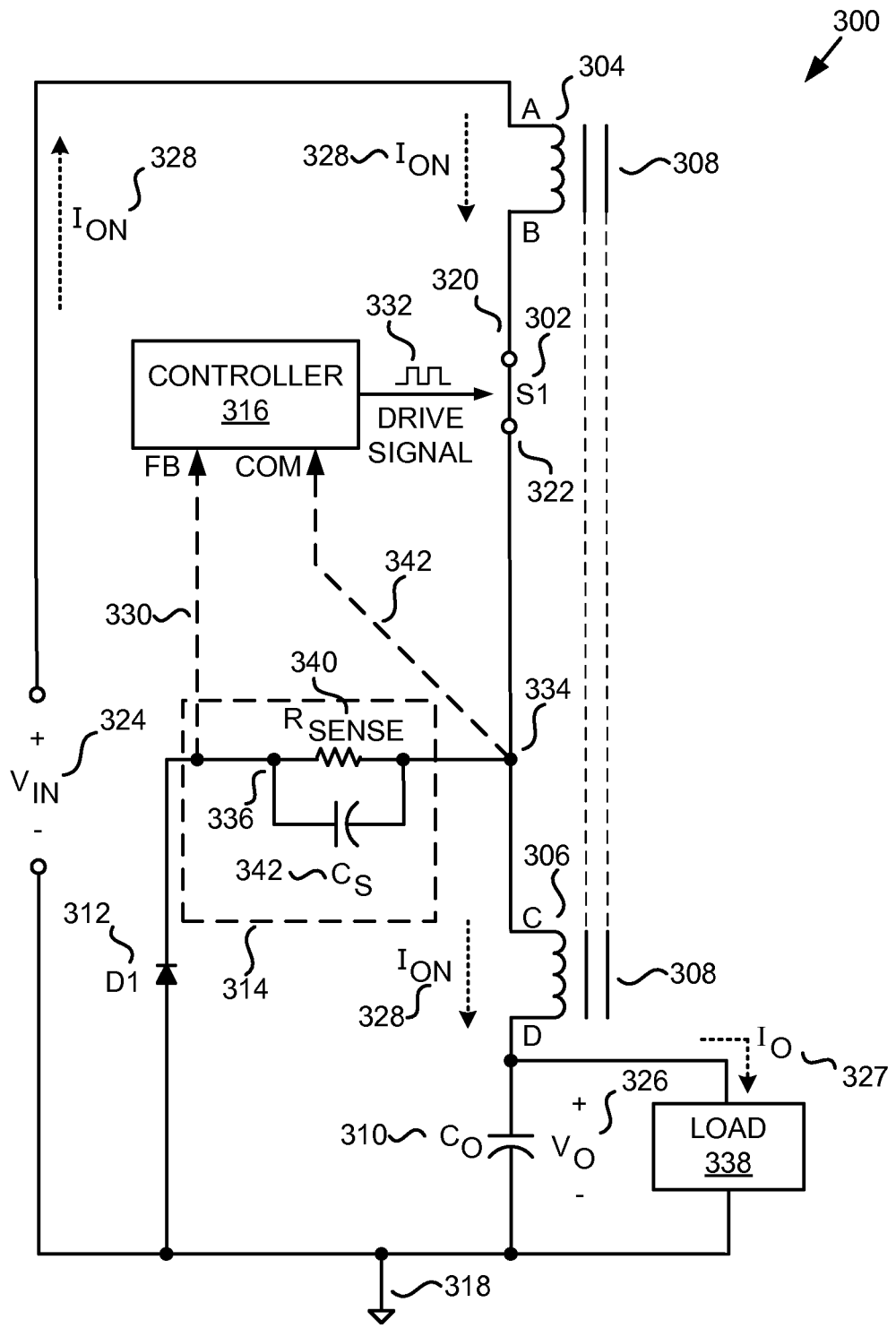
FIG. 3A is a schematic diagram illustrating a power converter having a switch in an ON state, in accordance with an embodiment of the invention.

FIG. 3A is a schematic diagram illustrating a power converter 300 having a switch S1 302 in an ON state, in accordance with an embodiment of the invention. Power converter 300 is illustrated as including switch S1 302, a first winding 304, a second winding 306, a core 308, an output capacitor $C_O$ 310, a diode D1 312, a sense circuit 314, a controller 316 and a common reference 318. First winding 304 is illustrated as including terminals A and B, while second winding 306 is illustrated as including terminals C and D. Switch S1 302 is illustrated as including terminals 320 and 322 and sense circuit 314 is illustrated as including a resistor $R_{SENSE}$ 340 and a capacitor $C_{SENSE}$ 342. Also shown in FIG. 3A are an input voltage $V_{IN}$ 324, an output voltage $V_o$ 326, an output current $I_O$ 327, a current $I_{ON}$ 328, a feedback signal 330, a drive signal 332, a reference node 334, a node 336, and a load 338.

As shown in FIG. 3A, first winding 304 is magnetically coupled to second winding 306 by way of core 308. That is, core 308 is common to both first winding 304 and to second winding 306. In one embodiment, first winding 304 and second winding 306 are first and second portions, respectively, of a main inductor. Thus, a main inductor included in power converter 300 may include a wire wound around a single core, where the wire has been separated into first and second portions corresponding to first winding 304 and second winding 306, respectively. In one embodiment, core 308 includes a ferromagnetic material.

Terminal A of first winding 304 is coupled to receive input voltage $V_{IN}$ 324. In one embodiment, the input voltage $V_{IN}$ 324 is a rectified and filtered ac voltage. Power converter 300 may optionally include rectifier and filter circuits (not shown) coupled to provide input voltage $V_{IN}$ 324 to terminal A of first winding 304.

Switch S1 302 is coupled between first winding 304 and second winding 306. More particularly, FIG. 3A illustrates terminal 320 of switch S1 302 as being coupled to terminal B of first winding 304, while terminal 322 of switch S1 304 is coupled to reference node 334. In one embodiment, switch S1 302 is coupled such that current $I_{ON}$ 328 flows through first winding 304, through switch S1 302 and through second winding 306 when switch S1 302 is in an ON state (i.e., closed). Switch S1 302 may be implemented as a semiconductor device such as for example a metal oxide semiconductor field effect transistor (MOSFET), a bipolar junction transistor (BJT), or an insulated gate bipolar transistor (IGBT).

Controller 316 is shown in FIG. 3A as being coupled to provide drive signal 332 to control the switching of the switch S1 302 to regulate an output of power converter 300. The regulated output is generally in the form of regulated voltage (e.g., output voltage $V_O$ 326), current (e.g., output current $I_O$ 327), output power or some combination thereof. Controller 316 regulates the output by controlling switch S1 302 to turn on and off in response to feedback signal 330. Feedback signal 330 may be representative of output voltage $V_O$ 326, output current $I_O$ 327, output power or some combination thereof. In addition, the feedback signal 330 may be a voltage signal or a current signal. Controller 316 may be implemented as a monolithic integrated circuit, may be implemented with discrete electrical components or may be implemented as a combination of discrete and integrated components. Controller 316 and switch S1 302 could form part of an integrated control circuit that is manufactured as either a hybrid or a monolithic integrated circuit.

Second winding 306 is illustrated in FIG. 3A as being coupled between switch S1 302 and output capacitor $C_O$ 310. More particularly, FIG. 3A illustrates terminal C of second winding 306 as being coupled to reference node 334 while terminal D is coupled to output capacitor $C_O$ 310. As mentioned above in one embodiment, a current (i.e., current $I_{ON}$ 328) flows through second winding 306, which is substantially the same as the current that flows through first winding 304 and switch S1 302 when switch S1 302 is in the ON state.

FIG. 3A further illustrates output capacitor $C_O$ 310 as coupled between second winding 306 and common reference 318. In the illustrated embodiment, the output capacitor $C_O$ 310 filters the output voltage $V_O$ 326 or the output current $I_O$ 327. As shown, the output voltage $V_O$ 326 is the voltage across output capacitor $C_O$ 310.

Figure 3B:
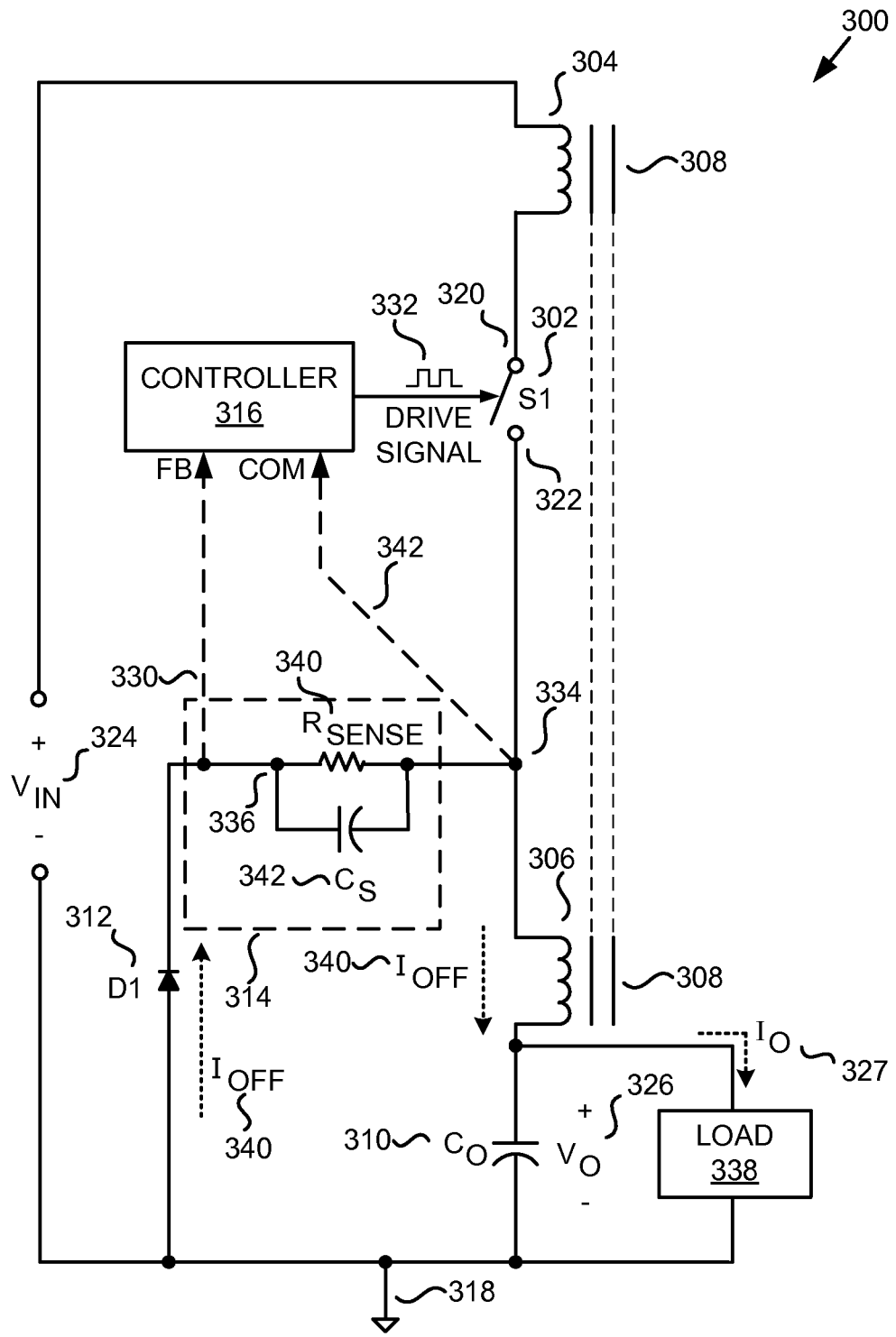
FIG. 3B is a schematic diagram illustrating the power converter of FIG. 3A with the switch in an OFF state.

Diode D1 312 is illustrated as being coupled between controller 316 and common reference 318. More particularly, an anode of diode D1 312 may be coupled to common reference 318, while a cathode of diode D1 312 is coupled to node 336 to provide a path for current to flow from the second winding 306 when switch S1 302 is in the OFF state. For example, FIG. 3B is a schematic diagram illustrating power converter 300 of FIG. 3A with switch S1 302 in the OFF state. As shown in FIG. 3B, during operation, controller 316 switches switch S1 302 to the OFF state, thereby substantially preventing current from flowing through first winding 304 and through switch S1 302. However, as illustrated in FIG. 3B, a current (i.e., current $I_{OFF}$ 340) flows through second winding 306, which is substantially the same as the current that flows through diode D1 312 when switch S1 302 is in the OFF state.

Referring now to both FIGS. 3A and 3B, power converter 300 may include a sense circuit 314 coupled to provide feedback signal 330 to controller 316. Although FIGS. 3A and 3B illustrate sense circuit 314 as including a sense resistor $R_{SENSE}$ 340 and a sense capacitor $C_S$ 342, sense circuit 214 may include discrete, active or a combination of discrete and active components in accordance with the teachings of the present invention. In one embodiment sense resistor $R_{SENSE}$ 340 includes one terminal coupled to reference node 334 and another terminal coupled to node 336 with sense capacitor $C_S$ 342 coupled across sense resistor $R_{SENSE}$ 340. As shown in FIGS. 3A and 3B, sense circuit 314 is further coupled between switch S1 302 and controller 316 to provide feedback signal 330, which in one example is representative of output current $I_O$ 327. In one embodiment, sense circuit 314 generates the feedback signal 330 in response to a voltage taken with respect to reference node 334. However, reference node 334 may be directly connected (i.e., electrically shorted) to terminal 322 of switch S1 302. Thus, sense circuit 314 may generate feedback signal 330 in response to a voltage taken with respect to terminal 322 of switch S1 302. Sense circuit 314 may also generate feedback signal 330 in response to the voltage across sense resistor $R_{SENSE}$ 340. In one example reference node 334 is connected to a common terminal COM of controller 316 by way of optional connection 342 as the reference ground of the controller 316. In one example the reference ground (e.g., common terminal COM) of the controller 316 is the reference voltage level relative to which drive signal 332 is generated and feedback signal 330 is sensed. Therefore, embodiments of the present invention may include the feedback signal 330 generated across sense circuit 314 also relative to reference node 334.

In one embodiment, controller 316 includes a feedback terminal FB that is directly connected to node 336 and thus feedback signal 330 has a positive voltage with respect to the node 334 and terminal 322 of switch S1 302. Furthermore, in the illustrated embodiment of FIGS. 3A and 3B, sense circuit 314 provides feedback signal 330 which is representative of an output of power converter 300 during the OFF state of switch S1 302. In the example, capacitor $C_S$ 342 is therefore placed in parallel to resistor 340 as a means of filtering the voltage signal generated across resistor 340 to provide a substantially dc feedback signal 330 to controller 316 relative to reference node 334 in accordance with the teachings of the present invention.

Figure 4:
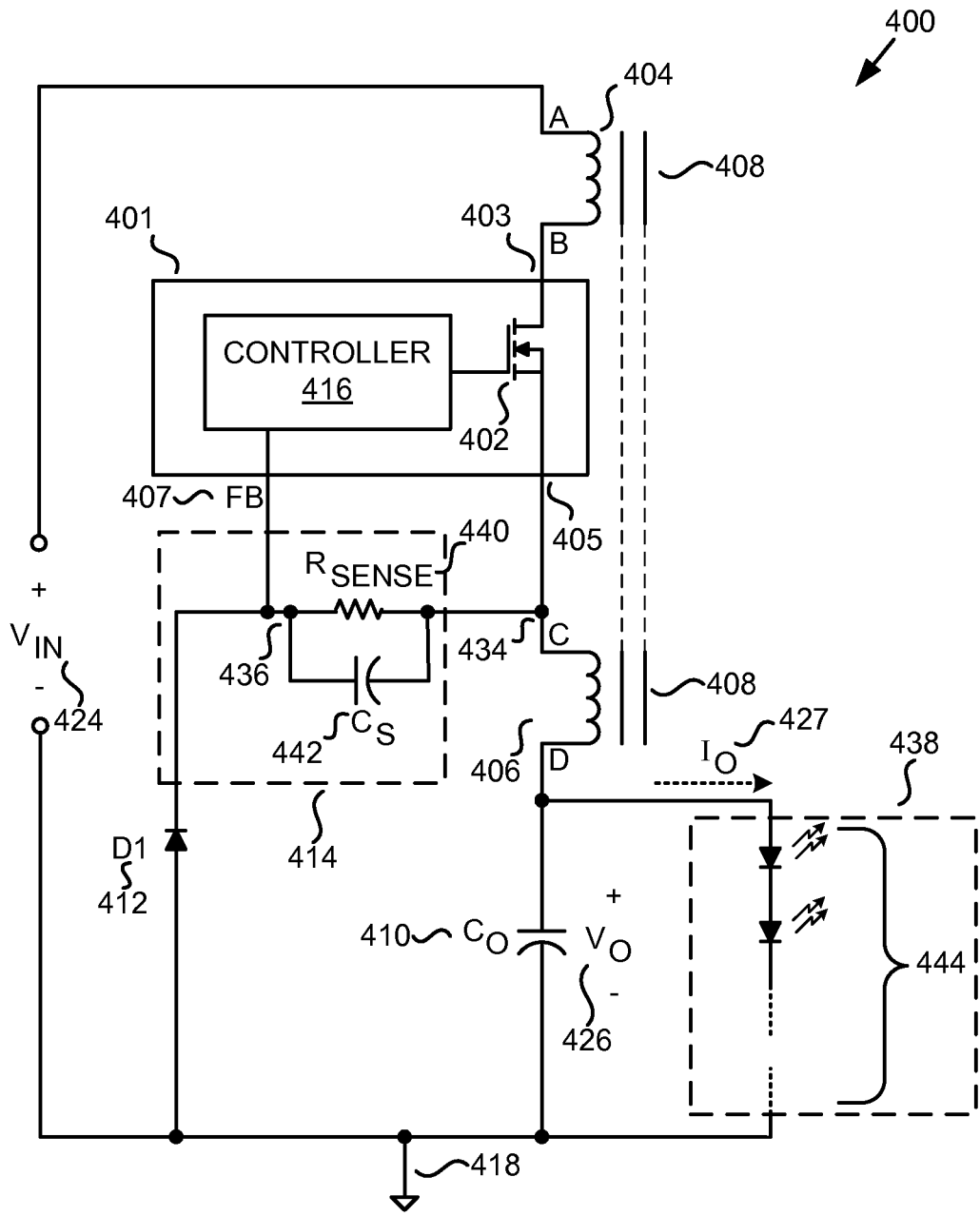
FIG. 4 is a schematic diagram illustrating a power converter having an integrated control circuit, in accordance with an embodiment of the invention.

FIG. 4 is a schematic diagram illustrating a power converter 400 having an integrated control circuit 401, in accordance with an embodiment of the invention. Power converter 400 is one possible implementation of power converter 300 of FIGS. 3A and 3B. Power converter 400 is illustrated as including integrated control circuit 401, a first winding 404, a second winding 406, a core 408, an output capacitor $C_O$ 410, a diode 412, a sense circuit 414 and a common reference 418. Integrated control circuit 401 is illustrated as including a switch S1 402, a controller 416, and terminals 403, 405, and 407. First winding 404 is illustrated as including terminals A and B, while second winding 406 is illustrated as including terminals C and D. Sense circuit 414 is illustrated as including a resistor $R_{SENSE}$ 440 and a capacitor $C_{SENSE}$ 442. Also shown in FIG. 4 are an input voltage $V_{IN}$ 424, an output voltage $V_O$ 426, an output current $I_O$ 427, a reference node 434, a node 436, and a load 438. Load 438 is illustrated as including an array of light emitting diodes (LEDs) 444.

As shown in FIG. 4, first winding 404 is magnetically coupled to second winding 406 by way of core 408. That is, core 408 is common to both first winding 404 and to second winding 406. In one embodiment, first winding 404 and second winding 406 are first and second portions, respectively, of a main inductor. Thus, a main inductor included in power converter 400 may include a wire wound around a single core, where the wire has been separated into first and second portions corresponding to first winding 404 and second winding 406, respectively. In one embodiment, core 408 includes a ferromagnetic material.

Terminal A of first winding 404 is illustrated as being coupled to receive input voltage $V_{IN}$ 424. In one embodiment, the input voltage $V_{IN}$ 424 is a rectified and filtered ac voltage. Power converter 400 may optionally include rectifier and filter circuits (not shown) coupled to provide input voltage $V_{IN}$ 424 to terminal A of first winding 404.

Integrated control circuit 401 is illustrated as being coupled between first winding 304 and second winding 306. More particularly, FIG. 4 illustrates terminal 403 of integrated control circuit 401 as being coupled to terminal B of first winding 404, while terminal 405 of integrated control circuit 401 is coupled to reference node 434. In one embodiment, integrated control circuit 401 is coupled such that current $I_{ON}$ 428 flows through first winding 404, between terminals 403 and 405, and through second winding 406 when switch 402 is in an ON state (i.e., closed). Although FIG. 4 illustrates switch 402 a metal oxide semiconductor field effect transistor (MOSFET), switch 403 may also be implemented as a semiconductor device such as for example a bipolar junction transistor (BJT), or an insulated gate bipolar transistor (IGBT). Switch 402 is illustrated as including a drain terminal coupled to terminal 403 of integrated control circuit 401 and as including a source terminal coupled to terminal 405.

Also included in integrated control circuit 401 is controller 416 which is coupled to control switching of the switch 402 to regulate the output current $J_O$ 427 of power converter 400. Controller 416 regulates the output current $J_O$ 427 delivered to load 438 by controlling switch S1 402 to turn on and off by generating a drive signal in response to a feedback signal received at feedback terminal 407. The feedback signal at terminal 407 may be representative of the output current $J_O$ 427.

Second winding 406 is illustrated in FIG. 4A as being coupled between integrated control circuit 401 and output capacitor $C_O$ 410. FIG. 4 illustrates terminal C of second winding 406 as being coupled to reference node 434 while terminal D is coupled to output capacitor $C_O$ 410. As mentioned above in one embodiment, a current (i.e., current $I_{ON}$ 428) flows through second winding 406, which is substantially the same as the current that flows through first winding 404 and between terminals 403 and 405 of integrated control circuit 401 when switch 402 is in the ON state.

FIG. 4 further illustrates output capacitor $C_O$ 410 as coupled between second winding 406 and common reference 418. In the illustrated embodiment, the output capacitor $C_O$ 410 filters the output of the power converter 400 to provide a substantially constant output voltage $V_O$ 426 or output current $J_O$ 427. As shown, the output voltage $V_O$ 426 is the voltage across output capacitor $C_O$ 410

Diode D1 412 is illustrated as being coupled between integrated control circuit 401 and common reference 418. More particularly, an anode of diode D1 412 may be coupled to common reference 418, while a cathode of diode D1 412 is coupled to node 436 to provide a path for current to flow from second winding 406 when switch 402 is in the OFF state. During operation, controller 416 switches switch 402 to the OFF state, thereby substantially preventing current from flowing through first winding 404 and through switch 402. However, a current (see e.g., current $I_{OFF}$ 340 of FIG. 3B) flows through second winding 406, which is substantially the same as the current that flows through diode D1 412 when switch 402 is in the OFF state.

Power converter 400 may include a sense circuit 414 coupled to provide a feedback signal to feedback terminal 407 of integrated control circuit 401. Although FIG. 4 illustrates sense circuit 414 as including a sense resistor $R_{SENSE}$ 440 and a sense capacitor $C_S$ 442, sense circuit 414 may include discrete, active or a combination of discrete and active components in accordance with the teachings of the present invention. In one embodiment sense resistor $R_{SENSE}$ 440 includes one terminal coupled to reference node 434 and another terminal coupled to node 436 with sense capacitor $C_S$ 442 coupled across sense resistor $R_{SENSE}$. As shown in FIG. 4, sense circuit 414 is further coupled between terminals 405 and 407 of integrated control circuit 401. In one embodiment, sense circuit 414 generates a feedback signal in response to a voltage taken with respect to reference node 434. However, reference node 434 may be directly connected (i.e., electrically shorted) to terminal 405 of integrated control circuit 401. Thus, sense circuit 414 may generate the feedback signal in response to a voltage taken with respect to terminal 405 of integrated control circuit 401 where in one example terminal 405 is a common terminal (e.g., the reference ground of integrated control circuit 401). In one example the reference ground (e.g., common terminal 405) of integrated control circuit 401 is the reference voltage level relative to which a drive signal is generated by controller 416 and then applied to the gate of switch 402. Thus, the reference ground of both controller 416 and of integrated control circuit 401 may be the reference voltage level at common terminal 405. Also, the reference ground of integrated control circuit 401 may be the reference voltage level relative to which a feedback signal that is received at feedback terminal FB 407 is sensed. Therefore, embodiments of the present invention may include a feedback signal received at feedback terminal FB 407 that is generated across sense circuit 414 also relative to common terminal 405.

Sense circuit 414 may also generate the feedback signal in response to a voltage across sense resistor $R_{SENSE}$. In the illustrated embodiment, the voltage across sense resistor $R_{SENSE}$ 440 is representative of output current $I_O$ 427 when switch 402 is in the OFF state and capacitor $C_S$ 442 filters the voltage across sense resistor $R_{SENSE}$ 440 to provide a substantially dc feedback signal to FB terminal 407 of integrated circuit 401.

In the illustrated embodiment, feedback terminal 407 is directly connected to node 436 and thus the feedback signal received at terminal 407 is a positive voltage with respect to node 434 and terminal 405 of the integrated control circuit 401. Furthermore, in the illustrated embodiment of FIG. 4, sense circuit 414 provides a feedback signal at feedback terminal 407 which is representative of output current $I_O$ 427 during the OFF state of switch 402.

Figure 5:
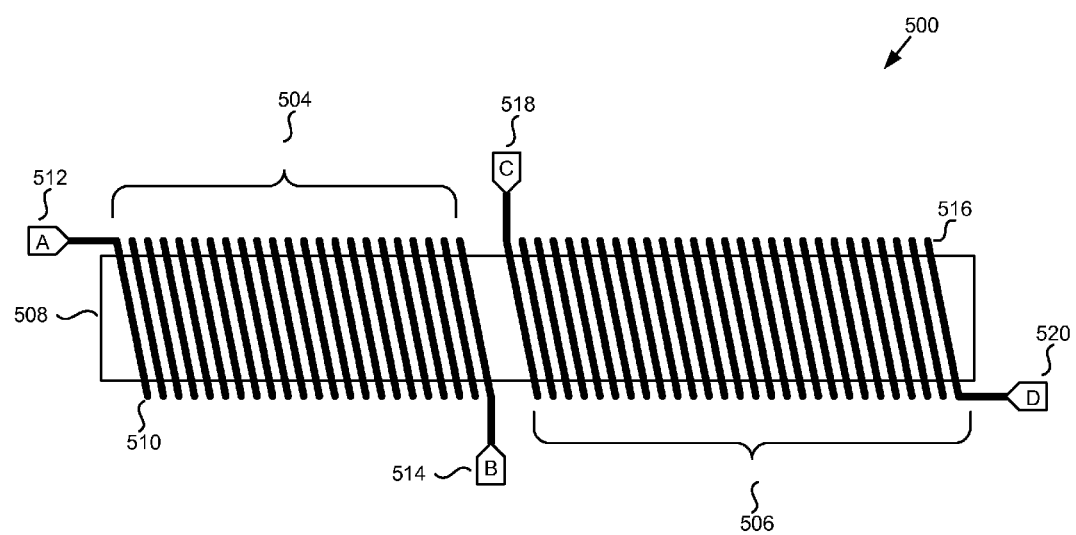
FIG. 5 is a diagram illustrating a main inductor, in accordance with an embodiment of the invention.

FIG. 5 is a diagram illustrating a main inductor 500, in accordance with an embodiment of the invention. Main inductor 500 is one possible implementation of the first and second windings included in power converters 100, 200, 300 or 400 of FIGS. 1A, 1B, 2B, 2C, 3A, 3B, and 4. Main inductor 500 is illustrated in FIG. 5 as including a first winding 504, a second winding 506 and a core 508. First winding 504 is illustrated as including a first wire 510, a terminal A 512 and a terminal B 514. The second winding 506 is illustrated as including a second wire 516, a terminal C 518 and a terminal D 520.

As shown in FIG. 5, first winding 504 is magnetically coupled to second winding 506 by way of core 508. That is, core 508 is common to both first winding 404 and to second winding 506. In one embodiment, first winding 504 and second winding 506 are first and second portions, respectively, of a main inductor. Thus, main inductor 500 may include a wire wound around a single core where the wire has been separated into first wire 510 and second wire 516 corresponding to first winding 504 and second winding 506, respectively. Although FIG. 5 illustrates core 508 as a cylindrical rod, core 508 may be configured to include any suitable shape, such as, an I-shaped core, a C- or U-shaped core, an E-shaped core, or an toroidal-shaped core, etc. In one embodiment, core 508 includes a ferromagnetic material. In another embodiment core 508 is an air core, where wires 510 and 516 are stiff coil wire shaped to form a hollow space in the center of the coil.

The power supplies illustrated in FIGS. 6A, 6B, 7, 8 and 9 may be utilized in applications in which the load utilizes a negative voltage while the controller receives a positive voltage for the feedback signal. The power converters in FIGS. 6A, 6B, 7, 8, and 9 in general have inputs coupled to sources of electrical energy and have outputs coupled to a load. For example, power converter 600 includes terminals 601 and 603 as an input coupled to a source of electrical energy (i.e., source of input voltage $V_{IN}$ 624). Power converter 600 also includes terminal 605 and 607 as an output that is coupled to load 638.

Figure 6A:
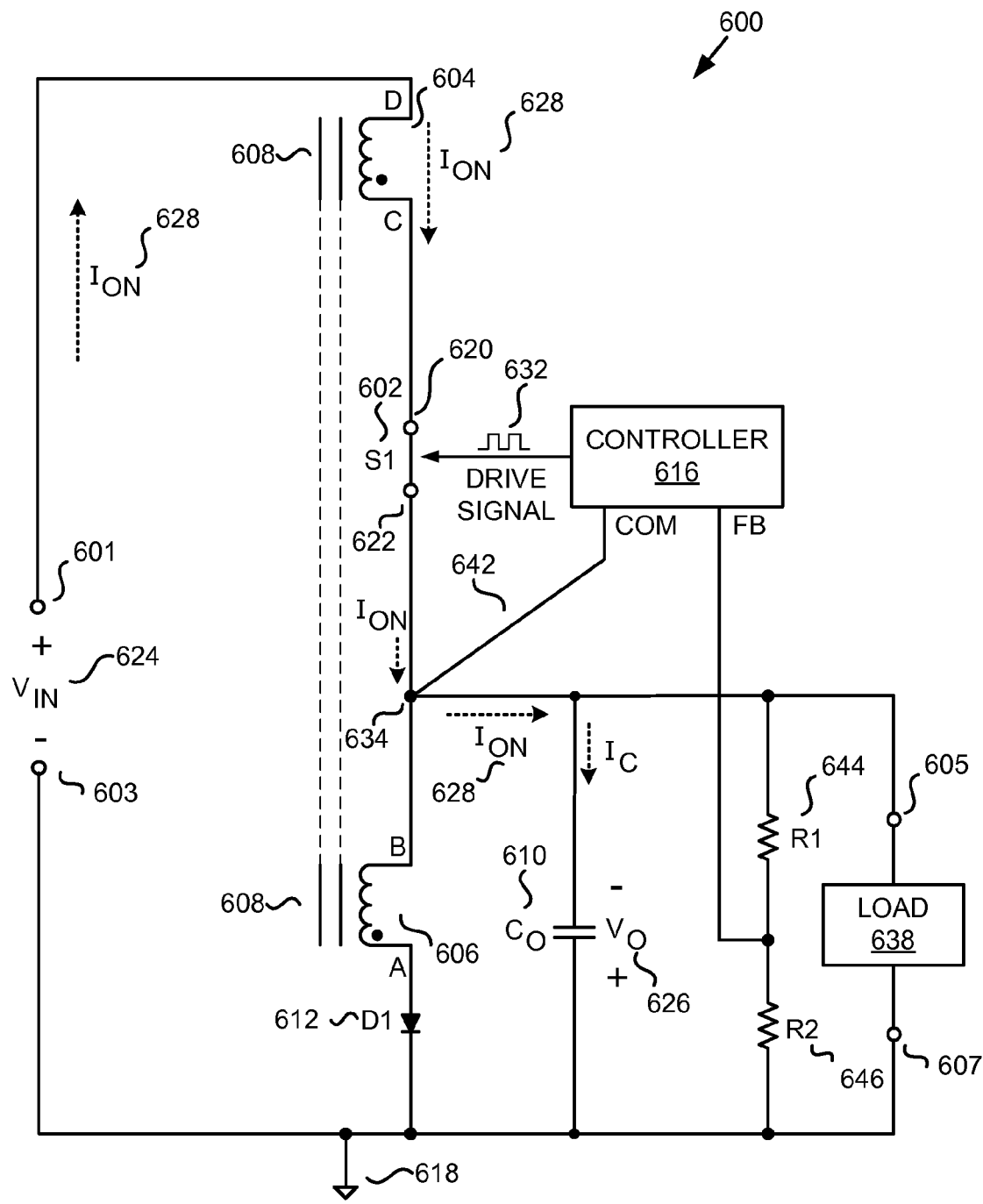
FIG. 6A is a schematic diagram illustrating a power converter having a switch in an ON state, in accordance with an embodiment of the invention.

FIG. 6A is a schematic diagram illustrating a power converter 600 having a switch S1 602 in an ON state, in accordance with an embodiment of the present invention. Power converter 600 is illustrated as including switch S1 602, a first winding 604, a second winding 606, a core 608, an output capacitor $C_O$ 610, a diode D1 612, a controller 616, a common reference 618, a resistor R1 644, and a resistor R2 646. Resistor R1 644 and resistor R2 646 may also be referred to as a sense circuit. First winding 604 is illustrated as including terminals C and D, while second winding 606 is illustrated as including terminals A and B. Switch S1 602 is illustrated as including terminals 620 and 622. Also shown in FIG. 6A is an input voltage $V_{IN}$ 624, an output voltage $V_O$ 626, a current $I_{ON}$ 628, a drive signal 632, a reference node 634, and a load 638.

As shown in FIG. 6A, first winding 604 is magnetically coupled to second winding 606 by way of core 608. That is, core 608 is common to both first winding 604 and to second winding 606. In one embodiment, first winding 604 and second winding 606 are first and second portions, respectively, of a main inductor. Thus, a main inductor included in power converter 600 may include a wire wound around a single core, where the wire has been separated into first and second portions corresponding to first winding 604 and second winding 606, respectively. In one embodiment, core 608 includes a ferromagnetic material. Main inductor 500 shown in FIG. 5 is one possible implementation of first winding 604 and second winding 606.

In one example of the illustrated embodiment of power converter 600, the number of turns for first winding 604 is much greater than the number of turns for second winding 606. When the number of turns for the first winding 604 is much greater than the number of turns for the second winding 606, output capacitor $C_O$ 610 discharges during the ON time and charges during the OFF time of switch S1 602. The output voltage $V_O$ 626 may also be negative with respect to the common reference 618 due in part to the duty ratio of drive signal 632.

Terminal D of first winding 604 is illustrated as being coupled to receive input voltage $V_{IN}$ 624. In one embodiment, power converter 600 is an ac-dc power converter where input voltage $V_{IN}$ 624 is a dc voltage that has been generated by rectifying and filtering an ac input voltage. Power converter 600 may optionally include rectifier and filter circuits (not shown) coupled to provide input voltage $V_{IN}$ 624 to terminal D of first winding 604.

Switch S1 602 is illustrated as being coupled between first winding 604 and second winding 606. More particularly, FIG. 6A illustrates terminal 620 of switch S1 602 as being coupled to terminal C of first winding 604, while terminal 622 of switch S1 602 is coupled to terminal B of second winding 606. In one embodiment, switch S1 602 is coupled such that current $I_{ON}$ 628 flows through first winding 604, through switch S1 602 and to output circuitry of the power converter 600 and to load 638 when switch S1 602 is in an ON state (i.e., closed). In one embodiment, output circuitry of the power converter 600 includes output capacitor $C_O$ 610 through which at least a portion (i.e., current $I_C$) of the current $I_{ON}$ 628 can flow since the impedance of a capacitor, such as output capacitor Co 610, is very low. As illustrated in FIG. 6A, the current of the output capacitor Co 610 is illustrated as current $I_C$. In one embodiment it will be noted that the current $I_{ON}$ 628 that flows during the ON time of switch S1 602, flows in a direction that decreases the value of an output voltage Vo 626 across output capacitor Co 610. Switch S1 602 may be implemented as a semiconductor device such as for example a metal oxide semiconductor field effect transistor (MOSFET), a bipolar junction transistor (BJT), or an insulated gate bipolar transistor (IGBT).

Controller 616 is coupled to provide drive signal 632 to control switching of the switch S1 602 to regulate an output of power converter 600. The regulated output is generally in the form of a regulated voltage (e.g., output voltage $V_o$ 626), current, output power or some combination thereof. In other words, the controller 616 regulates the flow of energy to the output of the power converter 600. Controller 616 regulates the output by controlling switch S1 602 to turn on and off in response to the signal received at the feedback terminal FB. In the example, the signal received at the feedback terminal FB is representative of the output voltage $V_O$ 626. In other examples, the signal received at the feedback terminal FB could be representative of an output current, output power or some combination thereof. Controller 616 may be implemented as a monolithic integrated circuit, or with discrete electrical components or a combination of discrete and integrated components. Controller 616 and switch S1 602 could form part of an integrated control circuit that is manufactured as either a hybrid or a monolithic integrated circuit. The controller 616 and switch S1 602 may be referred to as a control circuit.

FIG. 6A further illustrates output capacitor $C_O$ 610 as coupled across second winding 606 and diode D1 612. More particularly, one end of the output capacitor $C_O$ 610 is coupled to terminal B of second winding 606. The other end of the output capacitor $C_O$ 610 is coupled to the common reference 618. In the illustrated embodiment, the output capacitor $C_O$ 610 filters the output of the power converter 600 to provide a substantially constant output voltage $V_O$ 626 to the load 638. As shown, the output voltage $V_O$ 626 is the voltage across output capacitor $C_O$ 610. In one embodiment, the voltage at common reference 618 is greater than the voltage at terminal B of the second winding 606. As such, the output voltage $V_O$ 626 is negative with respect to the common reference 618.

Figure 6B:
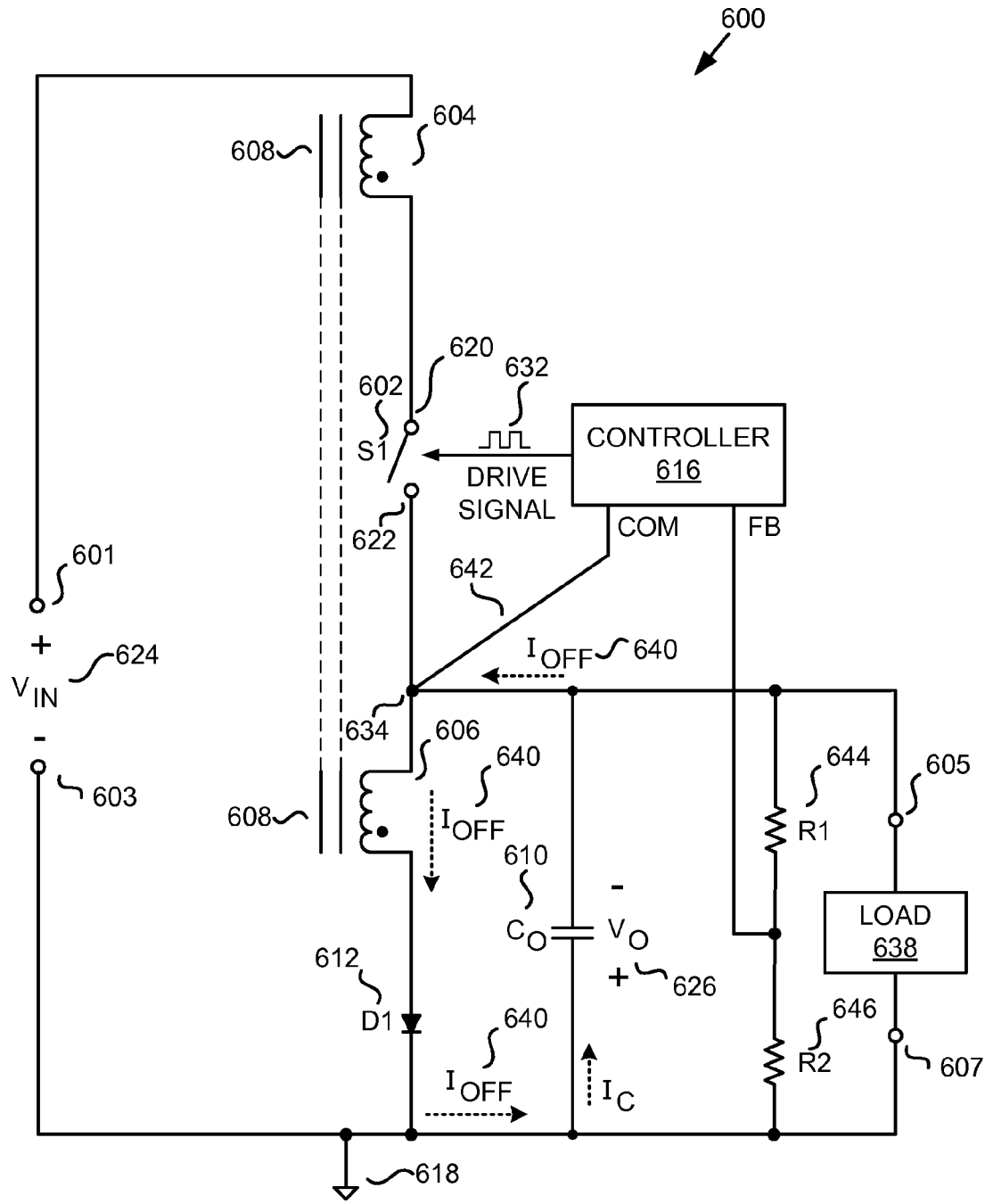
FIG. 6B is a schematic diagram illustrating the power converter of FIG. 6A having a switch in an OFF state.

Second winding 606 is illustrated in FIG. 6A as being coupled between switch S1 602 and diode D1 612. More particularly, terminal B of second winding 606 is coupled to output capacitor $C_O$ 610 while terminal A is coupled to diode D1 612. Diode D1 612 is illustrated as being coupled between second winding 606 and common reference 618. More particularly, an anode of diode D1 612 may be coupled to terminal A of the second winding 606, while a cathode of diode D1 612 is coupled to common reference 618 to provide a path for the current from the second winding 606 when switch S1 602 is in the OFF state. For example, FIG. 6B is a schematic diagram illustrating power converter 600 of FIG. 6A when switch S1 602 in the OFF state. As shown in FIG. 6B, during operation, controller 616 switches switch S1 602 to the OFF state, thereby substantially preventing current from flowing through first winding 604 and through switch S1 602. However, as illustrated in FIG. 6B, a current (i.e., current $I_{OFF}$ 640) flows through second winding 606, which is substantially the same as the current that flows through diode D1 612 when switch S1 602 is in the OFF state. The current $I_{OFF}$ 640 also flows to output circuitry of power converter 600. Since capacitor Co 610 is typically a low impedance, at least a portion (i.e., current $I_C$) of the current $I_{OFF}$ 640 flows through the capacitor Co 610. It should be noted that the direction of current flow $I_{OFF}$ 640 is such that it will increase the output voltage V0 626 across output capacitor Co 610. The direction of the current flow in output capacitor Co 610 during the ON state of switch 602 is therefore opposite to the direction of current flow in output capacitor Co 610 during the OFF state of switch 602 while current $I_{OFF}$ 640 is flowing.

Referring now to both FIGS. 6A and 6B, power converter 600 may also include resistors R1 644 and R2 646 as a sense circuit to provide a feedback signal to controller 616. The feedback signal may be a voltage signal or a current signal. In one embodiment, the feedback signal provided by resistors R1 644 and R2 646 is a voltage signal. Resistors R1 644 and R2 646 form a resistor divider on the output voltage $V_O$ 626. The feedback terminal FB of controller 616 is coupled between resistor R1 644 and resistor R2 646. In one embodiment, the feedback signal is the voltage across resistor R1 644. As mentioned above, in another embodiment it is recognized that the feedback signal could be representative of an output current flowing in the load 638 or another parameter. In general the controller 616 is therefore responsive to a feedback signal to regulate the flow of energy to an output of the power converter, regardless of the parameter being regulated (output current, output voltage, output power, etc). In one embodiment, the output voltage $V_O$ 626 is negative with respect to the common reference 618 and the voltage at the common reference 618 is greater than the voltage at terminal 622 of switch S1 602. As such the voltage received at the feedback terminal FB of the controller 616 is a positive voltage. In one embodiment the sense circuit is coupled to load 638. That is, resistors R1 644 and R2 646 may be coupled to load 638 without isolation circuitry therebetween. Resistor R1 644 is coupled to one end of load 638 while resistor R2 646 is coupled to the other end of load 638.

As shown in FIGS. 6A and 6B, the resistor divider formed by resistors R1 644 and R2 646 (sense circuit) is also coupled to terminal 622 of switch S1 602. In one embodiment, resistors R1 644 and R2 646 generate the feedback signal in response to a voltage taken with respect to terminal 622 of switch S1 602. In one example terminal 622 of switch S1 602 is connected to a common terminal COM of controller 616 by way of connection 642 as the reference ground of the controller 616. In one example the reference ground (e.g., common terminal COM) of the controller 616 is the reference voltage level relative to which drive signal 632 is generated and the feedback signal is sensed. In one embodiment, terminal 622 of switch S1 602 may be utilized as the common terminal COM of controller 616. For the power converter 600 illustrated in FIGS. 6A and 6B, the power converter 600 provides a negative output voltage $V_O$ 626 with respect to the common reference 618 to the load 638 while the controller 616 of the power converter 600 receives a positive voltage at the feedback terminal FB.

Figure 7:
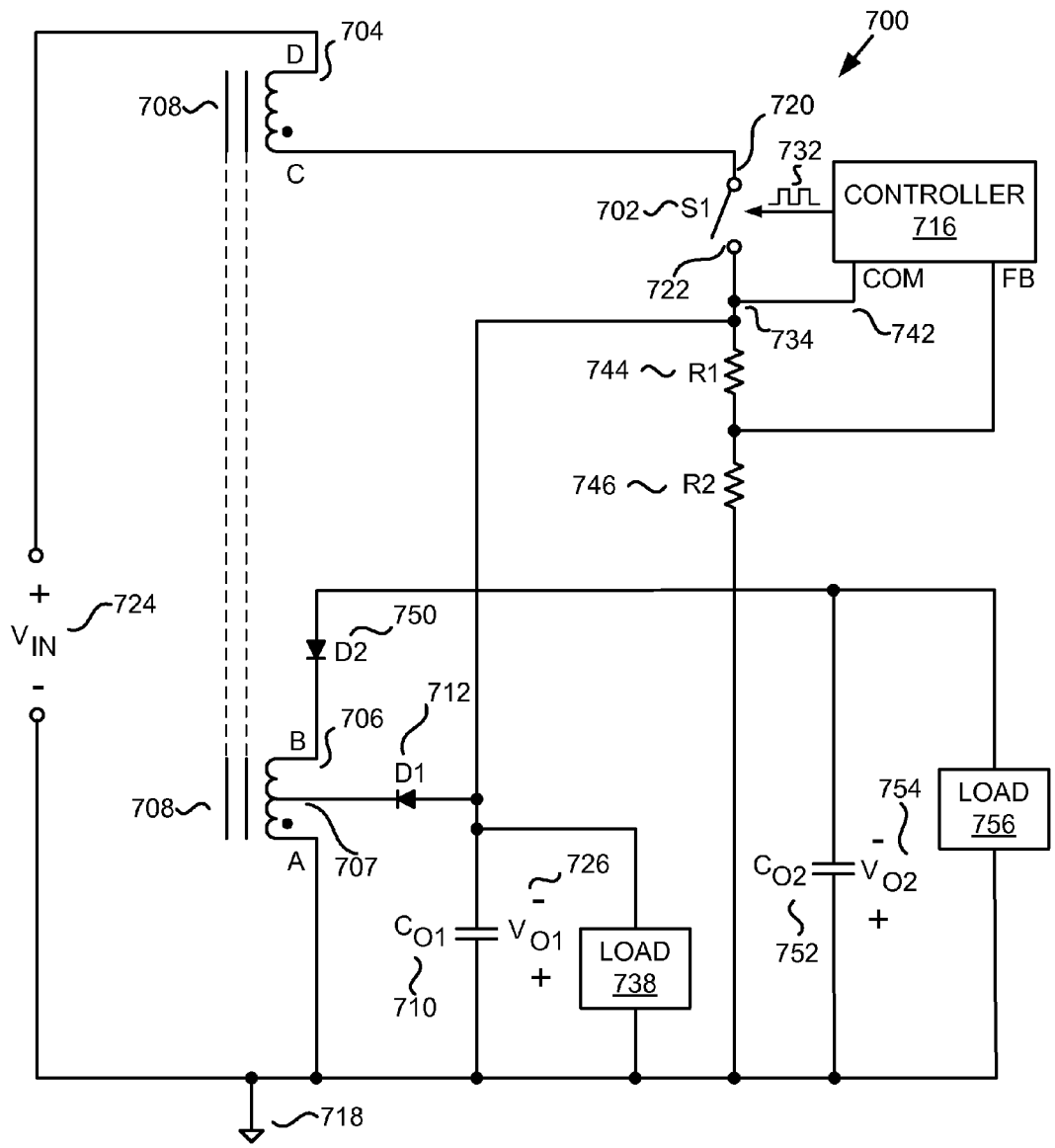
FIG. 7 is a schematic diagram illustrating a power converter with multiple outputs, in accordance with an embodiment of the invention.

FIG. 7 is a schematic diagram illustrating a power converter 700 with multiple outputs, in accordance with an embodiment of the invention. Power converter 700 is illustrated as including switch S1 702, a first winding 704, a second winding 706, a core 708, a first output capacitor $C_{O1}$ 710, a diode D1 712, a controller 716, a common reference 718, a resistor R1 744, a resistor R2 746, a diode D2 750, and a second output capacitor $C_{O2}$ 752. The combination of resistor R1 744 and resistor R2 746 may also be referred to as a sense circuit. First winding 704 is illustrated as including terminals C and D, while second winding 706 is illustrated as including terminals A and B. Second winding 706 also includes a winding tap 707. Switch S1 702 is illustrated as including terminals 720 and 722. Also shown in FIG. 7 are an input voltage $V_{IN}$ 724, a first output voltage $V_{O1}$ 726, a second output voltage $V_{O2}$ 754, a drive signal 732, a first load 738, and a second load 756. The power converter 700 is similar to the power converter 600 shown in FIGS. 6A and 6B however, power converter 700 illustrates an embodiment of the present with multiple outputs. Although, FIG. 7 illustrates power converter 700 as including two outputs, it should be appreciated that a power converter in accordance with embodiments of the present invention may have any number of outputs.

FIG. 7 further illustrates diode 712 and first output capacitor $C_{O1}$ 710 coupled to the winding tap 707 of second winding 706 to provide the first output voltage $V_{O1}$ 726 to the first load 738. FIG. 7 also illustrates diode D2 750 and second output capacitor $C_{O2}$ 752 coupled to terminal B of second winding 706 to provide the second output voltage $V_{O2}$ 754 to the second load 756.

As shown in FIG. 7, first winding 704 is magnetically coupled to second winding 706 by way of core 708. That is, core 708 is common to both first winding 704 and to second winding 706. In one embodiment, first winding 704 and second winding 706 are first and second portions, respectively, of a main inductor. Thus, a main inductor included in power converter 700 may include a wire wound around a single core, where the wire has been separated into first and second portions corresponding to first winding 704 and second winding 706, respectively. In one embodiment, core 708 includes a ferromagnetic material. Second winding 706 further includes a winding tap 707, illustrated as coupled to diode D1 712. In one example, winding tap 707 is an intermediate connection between terminals of a winding (e.g., between terminals A and B of second winding 706). Main inductor 500 shown in FIG. 5 is one possible implementation of first winding 704 and second winding 706, where a connection is added to winding 504 to serve as winding tap 707.

In one example of the illustrated embodiment of power converter 700, the number of turns for first winding 704 is much greater than the number of turns for second winding 706. When the number of turns for the first winding 704 is much greater than the number of turns for the second winding 706, output capacitor $C_{O1}$ 710 discharges during the ON time and charges during the OFF time of switch S1 702. The first output voltage $V_{O1}$ 726 and second output voltage $V_{O2}$ 754 may also be negative with respect to the common reference 718 due in part to the duty ratio of drive signal 732.

Terminal D of first winding 704 is illustrated as being coupled to receive input voltage $V_{IN}$ 724. In one embodiment, power converter 700 is an ac-dc power converter where input voltage $V_{IN}$ 724 is a dc voltage that has been generated by rectifying and filtering an ac input voltage. Switch S1 702 is illustrated as being coupled between first winding 704 and second winding 706. More particularly, FIG. 7 illustrates terminal 720 of switch S1 702 as being coupled to terminal C of first winding 704, while terminal 722 of switch S1 702 is coupled to the winding tap 707 of second winding 706 through diode D1 712. In one embodiment, switch S1 702 is coupled such that current flows through first winding 704, through switch S1 702 and to first output circuitry of the power converter 700 and to load 738 when switch S1 702 is in an ON state (i.e., closed). In one embodiment, first output circuitry of the power converter 700 includes first output capacitor $C_{O1}$ 710. Switch S1 702 may be implemented as a semiconductor device such as for example a metal oxide semiconductor field effect transistor (MOSFET), a bipolar junction transistor (BJT), or an insulated gate bipolar transistor (IGBT).

Controller 716 is coupled to provide drive signal 732 to control switching of the switch S1 702 to regulate an output of power converter 700. The regulated output is generally in the form of a regulated voltage (e.g., first output voltage $V_{O1}$ 726, second output voltage $V_{O2}$ 754, or both), current, output power or some combination thereof. For the example illustrated, the power converter 700 regulates the first output voltage $V_{O1}$ 726. Controller 716 regulates the output by controlling switch S1 702 to turn on and off in response to the signal received at the feedback terminal FB. In the example shown in FIG. 7, the signal received at the feedback terminal FB is representative of the first output voltage $V_{O1}$ 726. In other examples the signal received at the feedback terminal FB could be representative of an output current, output power or some combination thereof. Controller 716 may be implemented as a monolithic integrated circuit, or with discrete electrical components or a combination of discrete and integrated components. Controller 716 and switch S1 702 could form part of an integrated control circuit that is manufactured as either a hybrid or a monolithic integrated circuit. Controller 716 and switch S1 702 may be referred to as a control circuit.

As mentioned above, power converter 700 has multiple outputs. In one example, one end of first output capacitor $C_{O1}$ 710 is coupled to diode D1 712 and terminal 722 of switch S1 702 while the other end of first output capacitor $C_{O1}$ 710 is coupled to the common reference 718 and terminal A of second winding 706. In the illustrated embodiment, the first output capacitor $C_{O1}$ 710 filters one output of the power converter 700 to provide a substantially constant first output voltage $V_{O1}$ 726 to the first load 738. As shown, the first output voltage $V_{O1}$ 726 is the voltage across the first output capacitor $C_{O1}$ 710. In one embodiment, the voltage at the common reference 718 is greater than the voltage at terminal 722 of switch S1 702. As such, the first output voltage $V_{O1}$ 726 is negative with respect to the common reference 718.

In the illustrated example, one end of second output capacitor $C_{O2}$ 752 is coupled to diode D2 750 while the other end of second output capacitor $C_{O2}$ 752 is coupled to the common reference 718 and terminal A of second winding 706. In the illustrated embodiment, the second output capacitor $C_{O2}$ 752 filters another output of the power converter 700 to provide a substantially constant second output voltage $V_{O2}$ 754 to the second load 756. As shown, the second output voltage $V_{O2}$ 754 is the voltage across the second output capacitor $C_{O2}$ 752. In one embodiment, the second output voltage $V_{O2}$ 754 is negative with respect to the common reference 718. The magnitude of the second output voltage $V_{O2}$ 754 may be greater than the magnitude of the first output voltage $V_{O1}$ 726.

Second winding 706 is illustrated in FIG. 7 as being coupled between diode D2 750 and common reference 718. More particularly, terminal B of second winding 706 is coupled to the cathode of diode D2 750 while terminal A is coupled to common reference 718. The anode of diode D2 750 is coupled to second output capacitor $C_{O2}$ 752. In addition, the winding tap 707 of second winding 706 is coupled to the cathode of diode D1 712. The anode of diode D1 712 is coupled to first output capacitor $C_{O1}$ 710. When switch S1 702 is in the OFF state, current flows from the second winding 706 to the output circuitry of power converter 700. For example, current flows from the second winding 706 to the output circuitry of second output capacitor $C_{O2}$ 752 and second load 756. Current also flows from the second winding 706 to the output circuitry of the first output capacitor $C_{O1}$ 710 and first load 738.

Resistors R1 744 and R2 746 form a sense circuit to provide a feedback signal to controller 716. The feedback signal received at the feedback terminal FB of controller 716 may be a voltage signal or a current signal. In one embodiment, the feedback signal provided by resistors R1 744 and R2 746 is a voltage signal. As illustrated, resistors R1 744 and R2 746 form a resistor divider on the first output voltage $V_{O1}$ 726. The feedback terminal FB of controller 716 is coupled between resistor R1 744 and resistor R2 746. The voltage received at the feedback terminal FB of controller 716 is substantially the voltage across resistor R1 744. As mentioned above, the first output voltage $V_{O1}$ 726 is negative with respect to common reference 718. As such, the voltage received at the feedback terminal FB of the controller 716 is positive. Resistor R1 744 is coupled to one end of the first load 738 while resistor R2 746 is coupled to the other end of the first load 738. In addition, resistors R1 744 and R2 746 may be coupled to first load 738 without isolation circuitry therebetween.

As shown in FIG. 7, the resistor divider formed by resistors R1 744 and R2 746 (sense circuit) is also coupled to terminal 722 of switch S1 702. In one embodiment, resistors R1 744 and R2 746 generate the feedback signal in response to a voltage taken with respect to terminal 722 of switch S1 702. In one example, terminal 722 of switch S1 702 is connected to a common terminal COM of controller 716 by way of connection 742 as the reference ground of the controller 716. In one example the reference ground (e.g., common terminal COM) of the controller 716 is the reference voltage level relative to which drive signal 732 is generated and the feedback signal is sensed. In one embodiment, terminal 722 of switch S1 702 may be utilized as the common terminal COM of controller 716. For the power converter 700 illustrated in FIG. 7, the power converter 700 provides a negative first output voltage $V_{O1}$ 726 and a negative second output voltage $V_{O2}$ 754 with respect to the common reference 718 while the controller 716 of the power converter 700 receives a positive voltage at the feedback terminal FB.

Figure 8:
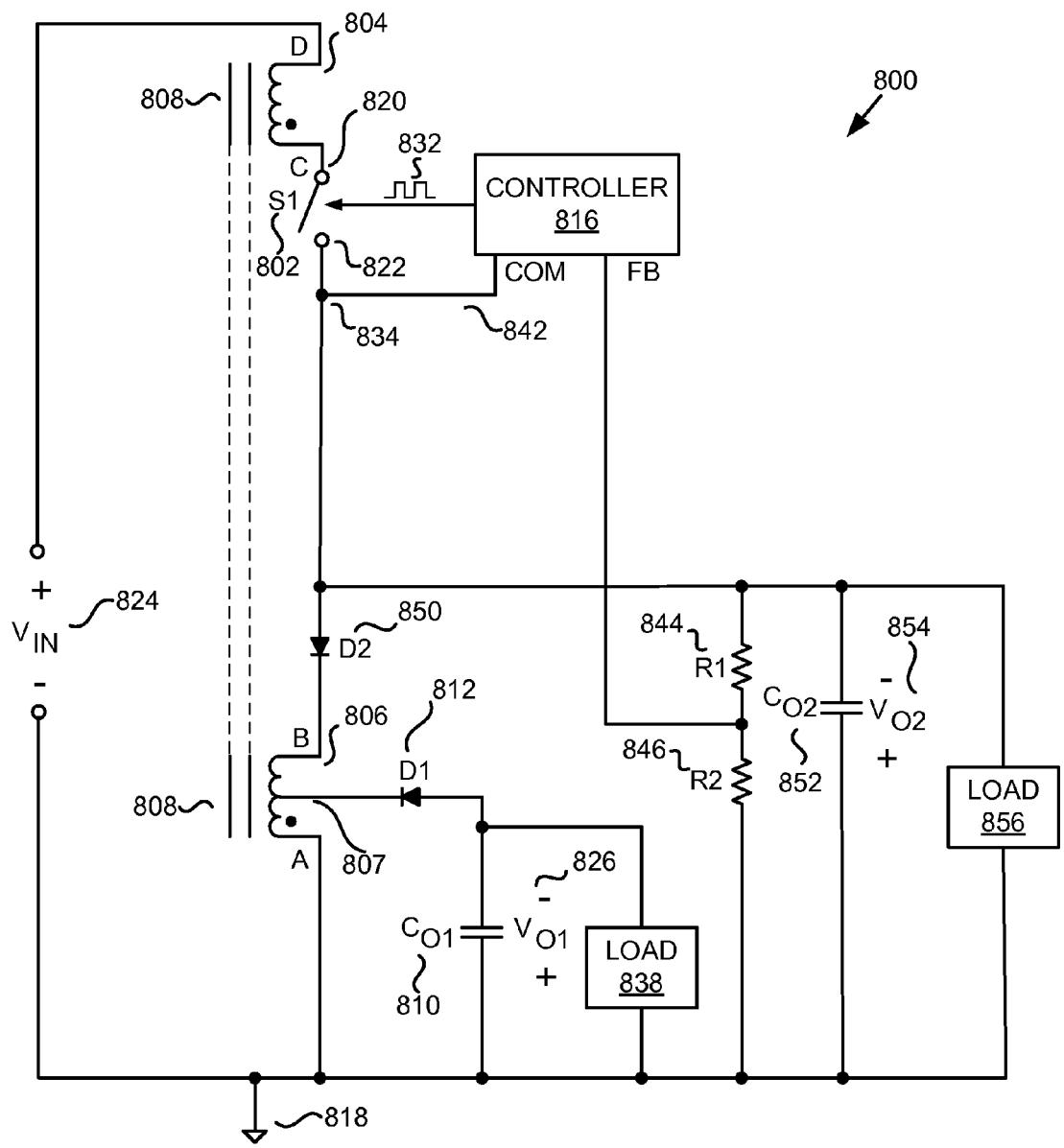
FIG. 8 is a schematic diagram illustrating another power converter having multiple outputs, in accordance with an embodiment of the invention.

FIG. 8 is a schematic diagram illustrating a power converter 800 with multiple outputs, in accordance with an embodiment of the invention. Power converter 800 is illustrated as including switch S1 802, a first winding 804, a second winding 806, a core 808, a first output capacitor $C_{O1}$ 810, a diode D1 812, a controller 816, a common reference 818, a resistor R1 844, a resistor R2 846, a diode D2 850, and a second output capacitor $C_{O2}$ 852. The combination of resistor R1 844 and resistor R2 846 may also be referred to as a sense circuit. First winding 804 is illustrated as including terminals C and D, while second winding 806 is illustrated as including terminals A and B. Second winding 806 also includes a winding tap 807. Switch S1 802 is illustrated as including terminals 820 and 822. Also shown in FIG. 8 is an input voltage $V_{IN}$ 824, a first output voltage $V_{O1}$ 826, a second output voltage $V_{O2}$ 854, a drive signal 832, a reference node 834, a first load 838, and a second load 856. The power converter 800 is similar to the power converter 700 shown in FIG. 7 however, power converter 800 illustrates an embodiment of the present invention where a feedback voltage is generated in response to the second output (i.e., voltage across second output capacitor $C_{O2}$ 852). Although FIG. 8 illustrates power converter 800 as including two outputs, it should be appreciated that a power converter in accordance with embodiments of the present invention may have any number of outputs.

FIG. 8 further illustrates diode 812 and first output capacitor $C_{O1}$ 810 coupled to the winding tap 807 of second winding 806 to provide the first output voltage $V_{O1}$ 826 to the first load 838. FIG. 8 also illustrates diode D2 850 and second output capacitor $C_{O2}$ 852 coupled to terminal B of second winding 806 to provide the second output voltage $V_{O2}$ 854 to the second load 856.

As shown in FIG. 8, first winding 804 is magnetically coupled to second winding 806 by way of core 808. That is, core 808 is common to both first winding 804 and to second winding 806. In one embodiment, first winding 804 and second winding 806 are first and second portions, respectively, of a main inductor. Thus, a main inductor included in power converter 800 may include a wire wound around a single core, where the wire has been separated into first and second portions corresponding to first winding 804 and second winding 806, respectively. In one embodiment, core 808 includes a ferromagnetic material. Second winding 806 further includes a winding tap 807, illustrated as coupled to diode D1 812. In one example, winding tap 807 is an intermediate connection between terminals of a winding (e.g., between terminals A and B of second winding 806). Main inductor 500 shown in FIG. 5 is one possible implementation of first winding 804 and second winding 806, where a connection is added to winding 504 to serve as winding tap 807.

In one example of the illustrated embodiment of power converter 800, the number of turns for first winding 804 is much greater than the number of turns for second winding 806. When the number of turns for the first winding 804 is much greater than the number of turns for the second winding 806, output capacitor $C_{O2}$ 852 discharges during the ON time and charges during the OFF time of switch S1 802. The first output voltage $V_{O1}$ 826 and second output voltage $V_{O2}$ 854 may also be negative with respect to the common reference 818 due in part to the duty ratio of drive signal 832.

Terminal D of first winding 804 is illustrated as being coupled to receive input voltage $V_{IN}$ 824. In one embodiment, power converter 800 is an ac-dc power converter where input voltage $V_{IN}$ 824 is a dc voltage that has been generated by rectifying and filtering an ac input voltage. Switch S1 802 is illustrated as being coupled between first winding 804 and second winding 806. More particularly, FIG. 8 illustrates terminal 820 of switch S1 802 as being coupled to terminal C of first winding 804, while terminal 822 of switch S1 802 is coupled to terminal B of second winding 806 through diode D2 850. In one embodiment, switch S1 802 is coupled such that current flows through first winding 804, through switch S1 802 and to the second output circuitry of the power converter 800 and to load 856 when switch S1 802 is in an ON state (i.e., closed). In one embodiment, the second output circuitry of the power converter 800 includes second output capacitor $C_{O2}$ 852. Switch S1 802 may be implemented as a semiconductor device such as for example a metal oxide semiconductor field effect transistor (MOSFET), a bipolar junction transistor (BJT), or an insulated gate bipolar transistor (IGBT).

Controller 816 is coupled to provide drive signal 832 to control switching of the switch S1 802 to regulate an output of power converter 800. The regulated output is generally in the form of a regulated voltage (e.g., first output voltage $V_{O1}$ 826, second output voltage $V_{O2}$ 854, or both), current, output power or some combination thereof. For the example illustrated, the power converter 800 regulates the second output voltage $V_{O2}$ 854. Controller 816 regulates the output by controlling switch S1 802 to turn on and off in response to the signal received at the feedback terminal FB. In the example shown in FIG. 8, the signal received at the feedback terminal FB is representative of the second output voltage $V_{O2}$ 854. In other examples the signal received at the feedback terminal FB could be representative of an output current, output power or some combination thereof. Controller 816 may be implemented as a monolithic integrated circuit, or with discrete electrical components or a combination of discrete and integrated components. Controller 816 and switch S1 802 could form part of an integrated control circuit that is manufactured as either a hybrid or a monolithic integrated circuit. Controller 816 and switch S1 802 may be referred to as a control circuit.

As mentioned above, power converter 800 has multiple outputs. In one example, one end of first output capacitor $C_{O1}$ 810 is coupled to diode D1 812 while the other end of output capacitor $C_{O1}$ 810 is coupled to the common reference 818. In the illustrated embodiment, the first output capacitor $C_{O1}$ 810 filters one output of the power converter 800 to provide a substantially constant first output voltage $V_{O1}$ 826 to the first load 838. As shown, the first output voltage $V_{O1}$ 826 is the voltage across the first output capacitor $C_{O1}$ 810. In one embodiment, the first output voltage $V_{O1}$ 826 is negative with respect to the common reference 818.

In the illustrated example, one end of second output capacitor $C_{O2}$ 852 is coupled to diode D2 850 and to terminal 822 of switch S1 802, while the other end of second output capacitor $C_{O2}$ 852 is coupled to the common reference 818. In the illustrated embodiment, the second output capacitor $C_{O2}$ 852 filters another output of the power converter 800 to provide a substantially constant second output voltage $V_{O2}$ 854 to the second load 856. As shown, the second output voltage $V_{O2}$ 854 is the voltage across the second output capacitor $C_{O2}$ 852. In one embodiment, the voltage at the common reference 818 is greater than the voltage at terminal 822 of switch S1 802. As such, the second output voltage $V_{O2}$ 854 is negative with respect to the common reference 818. The magnitude of the second output voltage $V_{O2}$ 854 may be greater than the magnitude of the first output voltage $V_{O1}$ 826.

Second winding 806 is illustrated in FIG. 8 as being coupled between diode D2 850 and common reference 818. More particularly, terminal B of second winding 806 is coupled to the cathode of diode D2 850 while terminal A is coupled to common reference 818. The anode of diode D2 850 is coupled to second output capacitor $C_{O2}$ 852 and terminal 822 of switch S1 802. In addition, the winding tap 807 of second winding 806 is coupled to the cathode of diode D1 812. The anode of diode D1 812 is coupled to first output capacitor $C_{O1}$ 810. When switch S1 802 is in the OFF state, current flows from the second winding 806 to the output circuitry of power converter 800. For example, current flows from the second winding 806 to the output circuitry of second output capacitor $C_{O2}$ 852 and second load 856. Current also flows from the second winding 806 to the output circuitry of the first output capacitor $C_{O1}$ 810 and first load 838.

The combination of resistors R1 844 and R2 846 form a sense circuit to provide a feedback signal to controller 816. The feedback signal received at the feedback terminal FB of controller 816 may be a voltage signal or a current signal. In one embodiment, the feedback signal provided by resistors R1 844 and R2 846 is a voltage signal. As illustrated, resistors R1 844 and R2 846 form a resistor divider on the second output voltage $V_{O2}$ 854. The feedback terminal FB of controller 816 is coupled between resistor R1 844 and resistor R2 846. The voltage received at the feedback terminal FB of controller 816 is substantially the voltage across resistor R1 844. As mentioned above, the second output voltage $V_{O2}$ 854 is negative with respect to common reference 818. As such, the voltage received at the feedback terminal FB of the controller 816 is positive. Resistor R1 844 is coupled to one end of the second load 856 while resistor R2 846 is coupled to the other end of the second load 856. In addition, resistors R1 844 and R2 846 may be coupled to load 856 without isolation circuitry therebetween.

As shown in FIG. 8, the resistor divider formed by resistors R1 844 and R2 846 (sense circuit) is also coupled to terminal 822 of switch S1 802. In one embodiment, resistors R1 844 and R2 846 generate the feedback signal in response to a voltage taken with respect to terminal 822 of switch S1 802. In one example, terminal 822 of switch S1 802 is connected to a common terminal COM of controller 816 by way of connection 842 as the reference ground of the controller 816. In one example the reference ground (e.g., common terminal COM) of the controller 816 is the reference voltage level relative to which drive signal 832 is generated and the feedback signal is sensed. In one embodiment, terminal 822 of switch S1 802 may be utilized as the common terminal COM of controller 816. For the power converter 800 illustrated in FIG. 8, the power converter 800 provides a negative first output voltage $V_{O1}$ 826 and a negative second output voltage $V_{O2}$ 854 with respect to the common reference 818 while the controller 816 of the power converter 800 receives a positive voltage at the feedback terminal FB.

Figure 9:
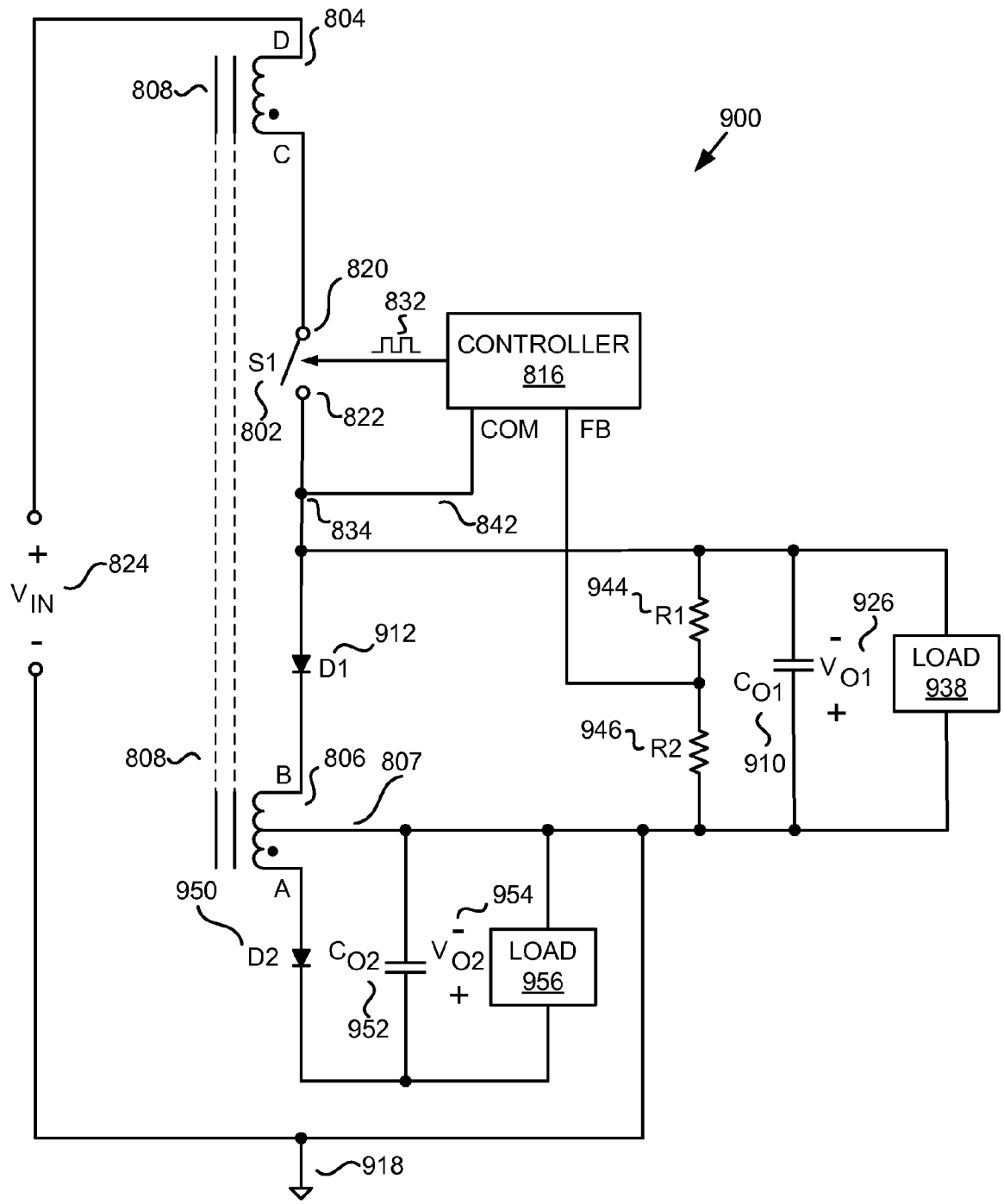
FIG. 9 is a schematic diagram illustrating a further power converter having multiple outputs, in accordance with an embodiment of the invention.

FIG. 9 is a schematic diagram illustrating power converter 900 with multiple outputs, in accordance with an embodiment of the invention. Power converter 900 is illustrated as including switch S1 802, first winding 804, second winding 806, core 808, a first output capacitor $C_{O1}$ 910, a diode D1 912, controller 816, a common reference 918, a resistor R1 944, a resistor R2 946, a diode D2 950, and a second output capacitor $C_{O2}$ 952. The combination of resistor R1 944 and resistor R2 946 may also be referred to as a sense circuit. First winding 804 is illustrated as including terminals C and D, while second winding 806 is illustrated as including terminals A and B. Second winding 806 also includes a winding tap 807. Switch S1 802 is illustrated as including terminals 820 and 822. Also shown in FIG. 9 is input voltage $V_{IN}$ 824, a first output voltage $V_{O1}$ 926, a second output voltage $V_{O2}$ 954, drive signal 832, reference node 834, a first load 938, and a second load 956. The power converter 900 is similar to the power converters illustrated in FIGS. 7 and 8, however, power converter 900 illustrates an embodiment of the present invention where one output voltage is negative with respect to the common reference 918 and the other output voltage is positive with respect to the common reference 918. Although FIG. 9 illustrates power converter 900 as including two outputs, it should be appreciated that a power converter in accordance with embodiments of the present invention may have any number of outputs.

Input voltage $V_{IN}$ 824, switch S1 802, first winding 804, second winding 806, core 808, controller 816, and drive signal 832 couple and function with respect to each other as described above. FIG. 9 also illustrates the common reference 918 as coupled to the winding tap 807 of second winding 806. In addition, FIG. 9 further illustrates diode D1 912 and first output capacitor $C_{O1}$ 910 coupled to terminal B of second winding 806 to provide the first output voltage $V_{O1}$ 926 to the first load 938. FIG. 9 further illustrates diode D2 950 and second output capacitor $C_{O2}$ 952 coupled to terminal A of second winding 806 to provide the second output voltage $V_{O2}$ 954 to the second load 956. As illustrated first output capacitor $C_{O1}$ 910 and second output capacitor $C_{O2}$ 952 couple to the winding tap 807 and common reference 918.

In one example of power converter 900, the number of turns for first winding 804 is much greater than the number of turns for second winding 806. When the number of turns for the first winding 804 is much greater than the number of turns for the second winding 806, first output capacitor $C_{O1}$ 910 discharges during the ON time and charges during the OFF time of switch S1 802. The first output voltage $V_{O1}$ 926 may also be negative with respect to the common reference 918 due in part to the duty ratio of drive signal 832.

As mentioned above, switch S1 802 is illustrated as being coupled between first winding 804 and second winding 806. More particularly, FIG. 9 illustrates terminal 820 of switch S1 802 as being coupled to terminal C of first winding 804, while terminal 822 of switch S1 802 is coupled to terminal B of second winding 806 through diode D1 912. In one embodiment, switch S1 802 is coupled such that current flows through first winding 804, through switch S1 802 and to the first output circuitry of the power converter 900 and to load 938 when switch S1 802 is in an ON state (i.e., closed). In one embodiment, the first output circuitry of the power converter 900 includes first output capacitor $C_{O1}$ 910.

Controller 816 is coupled to provide drive signal 832 to control switching of the switch S1 802 to regulate an output of power converter 900. For the example illustrated, the power converter 900 regulates the first output voltage $V_{O1}$ 926. Controller 816 regulates the output by controlling switch S1 802 to turn on and off in response to the signal received at the feedback terminal FB. In the example shown in FIG. 9, the signal received at the feedback terminal FB is representative of the first output voltage $V_{O1}$ 926.

Power converter 900 has multiple outputs. In one example, one end of first output capacitor $C_{O1}$ 910 is coupled to diode D1 912 and to terminal 822 of switch S1 802, while the other end of output capacitor $C_{O1}$ 910 is coupled to the common reference 918 and the winding tap 807 of second winding 806. In the illustrated embodiment, the first output capacitor $C_{O1}$ 910 filters one output of the power converter 900 to provide a substantially constant first output voltage $V_{O1}$ 926 to the first load 938. As shown, the first output voltage $V_{O1}$ 926 is the voltage across the first output capacitor $C_{O1}$ 910. In one embodiment, the voltage at the common reference 918 is greater than the voltage at terminal 822 of switch S1 802. As such, the first output voltage $V_{O1}$ 926 is negative with respect to the common reference 918.

In the illustrated example, one end of second output capacitor $C_{O2}$ 952 is coupled to diode D2 950, while the other end of second output capacitor $C_{O2}$ 852 is coupled to the common reference 918 and winding tap 807 of second winding 806. In the illustrated embodiment, the second output capacitor $C_{O2}$ 952 filters another output of the power converter 900 to provide a substantially constant second output voltage $V_{O2}$ 954 to the second load 956. As shown, the second output voltage $V_{O2}$ 954 is the voltage across the second output capacitor $C_{O2}$ 952. In one embodiment, the second output voltage $V_{O2}$ 954 is positive with respect to the common reference 918.

Second winding 806 is illustrated in FIG. 9 as being coupled between diode D1 912 and diode D2 950. More particularly, terminal B of second winding 806 is coupled to the cathode of diode D1 912 while terminal A is coupled to the anode of diode D2 950. The anode of diode D1 912 is coupled to first output capacitor $C_{O1}$ 910 and terminal 822 of switch S1 802. In addition, the winding tap 807 of second winding 806 is coupled to the common reference 918. The cathode of diode D2 950 is coupled to second output capacitor $C_{O2}$ 952. When switch S1 802 is in the OFF state, current flows from the second winding 806 to the output circuitry of power converter 900. For example, current flows from the second winding 806 through diode D2 950 and to the output circuitry of second output capacitor $C_{O2}$ 952 and second load 956. Current also flows from the winding tap 807 of the second winding 806 to the output circuitry of the first output capacitor $C_{O1}$ 910 and first load 938.

The combination of resistors R1 944 and R2 946 form a sense circuit to provide a feedback signal to controller 816. The feedback signal received at the feedback terminal FB of controller 816 may be a voltage signal or a current signal. In one embodiment, the feedback signal provided by resistors R1 944 and R2 946 is a voltage signal. As illustrated, resistors R1 944 and R2 946 form a resistor divider on the first output voltage $V_{O1}$ 926. The feedback terminal FB of controller 816 is coupled between resistor R1 944 and resistor R2 946. The voltage received at the feedback terminal FB of controller 816 is substantially the voltage across resistor R1 944. As mentioned above, the first output voltage $V_{O1}$ 926 is negative with respect to common reference 918. As such, the voltage received at the feedback terminal FB of the controller 816 is positive. Resistor R1 944 is coupled to one end of the first load 938 while resistor R2 946 is coupled to the other end of the first load 938.

As shown in FIG. 9, the resistor divider formed by resistors R1 944 and R2 946 (sense circuit) is also coupled to terminal 822 of switch S1 802. In one embodiment, resistors R1 944 and R2 946 generate the feedback signal in response to a voltage taken with respect to terminal 822 of switch S1 802. In one example, terminal 822 of switch S1 802 is connected to a common terminal COM of controller 816 by way of connection 842 as the reference ground of the controller 816. In one example the reference ground (e.g., common terminal COM) of the controller 816 is the reference voltage level relative to which drive signal 832 is generated and the feedback signal is sensed. In one embodiment, terminal 822 of switch S1 802 may be utilized as the common terminal COM of controller 816. For the power converter 900 illustrated in FIG. 9, the power converter 900 provides a negative first output voltage $V_{O1}$ 926 and a positive second output voltage $V_{O2}$ 954 with respect to the common reference 918 while the controller 816 of the power converter 900 receives a positive voltage at the feedback terminal FB.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-isolated power converter, comprising:
   a first winding;
   a second winding magnetically coupled to the first winding and electrically coupled to an output of the power converter;
   a switch coupled between the first winding and the second winding;
   a controller having a feedback terminal and a common terminal, wherein the controller is coupled to control the switch to regulate the output of the power converter in response to a feedback voltage received at the feedback terminal and wherein the feedback voltage is a positive voltage with respect to the common terminal; and an output capacitor coupled to provide an output voltage across the output capacitor to a load, wherein the output capacitor includes a first terminal coupled to the common terminal of the controller and a second terminal coupled to a common reference of the power converter, and wherein the output voltage is a negative voltage with respect to the common reference of the power converter.

2. The power of claim 1, wherein the common terminal of the controller is coupled to a terminal of the switch.

3. A non-isolated power converter, comprising:
a first winding;
a second winding magnetically coupled to the first winding and electrically coupled to an output of the power converter;
a switch coupled between the first winding and the second winding;
a controller having a feedback terminal and a common terminal, wherein the controller is coupled to control the switch to regulate the output of the power converter in response to a feedback voltage received at the feedback terminal and wherein the feedback voltage is a positive voltage with respect to the common terminal;
an output capacitor coupled to provide an output voltage across the output capacitor to a load, wherein the output capacitor includes a first terminal coupled to the common terminal of the controller and a second terminal coupled to a common reference of the power converter, and wherein the output voltage is a negative voltage with respect to the common reference of the power converter; and
a diode coupled between the second winding and the common reference of the power converter such that a current flows through the second winding and the diode when the switch is in an OFF state.

4. The power converter of claim 1, further comprising a main inductor, wherein the first winding is a first portion of the main inductor and wherein the second winding is a second portion of the main inductor.

5. The power converter of claim 4, wherein the main inductor comprises a ferromagnetic core and wherein the first portion of the main inductor includes a first wire wound around the ferromagnetic core and wherein the second portion of the main inductor includes a second wire wound around the ferromagnetic core.

6. The power converter of claim 1, further comprising a sense circuit coupled to the feedback terminal of the controller, wherein the sense circuit generates the feedback voltage in response to the output voltage.

7. The power converter of claim 6, wherein sense circuit includes a resistor divider coupled to receive the output voltage.

8. The power converter of claim 1, wherein the output is a first output coupled to provide a first output voltage to a first load, wherein the first output voltage is a negative voltage with respect to the common reference of the power converter, the power converter further comprising a second output coupled to the second winding and the common reference of the power converter to provide a second output voltage to a second load.

9. The power converter of claim 8, wherein the second output voltage is a negative voltage with respect to the common reference of the power converter.

10. The power converter of claim 8, wherein the second output voltage is a positive voltage with respect to the common reference of the power converter.

11. The power converter of claim 1, wherein the second winding includes a tap element, and wherein the switch is coupled, through a diode, to the tap element of the second winding.

12. The power converter of claim 1, wherein the controller is coupled to control the switch to regulate the output voltage of the power converter in response to the feedback voltage received at the feedback terminal.

13. A non-isolated power converter, comprising:
a first winding;
a second winding magnetically coupled to the first winding and electrically coupled to an output of the power converter;
an integrated control circuit coupled between the first and second windings, wherein the control circuit includes:
a first terminal coupled to the first winding;
a second terminal coupled to the second winding;
a switch coupled between the first terminal and the second terminal of the control circuit;
a feedback terminal coupled to receive a feedback voltage, wherein the feedback voltage is a positive voltage with respect to the second terminal of the integrated control circuit; and
a controller coupled to control the switch to regulate the output voltage of the power converter in response to the feedback voltage; and
an output capacitor coupled to provide the output voltage across the output capacitor to a load, wherein the output capacitor includes a first terminal coupled to the second terminal of the integrated control circuit and a second terminal coupled to a common reference of the power converter, and wherein the output voltage is a negative voltage with respect to the common reference of the power converter.

14. A non-isolated power converter, comprising:
a first winding;
a second winding magnetically coupled to the first winding and electrically coupled to an output of the power converter;
an integrated control circuit coupled between the first and second windings, wherein the control circuit includes:
a first terminal coupled to the first winding;
a second terminal coupled to the second winding;
a switch coupled between the first terminal and the second terminal of the control circuit;
a feedback terminal coupled to receive a feedback voltage, wherein the feedback voltage is a positive voltage with respect to the second terminal of the integrated control circuit; and
a controller coupled to control the switch to regulate the output voltage of the power converter in response to the feedback voltage;
an output capacitor coupled to provide the output voltage across the output capacitor to a load, wherein the output capacitor includes a first terminal coupled to the second terminal of the integrated control circuit and a second terminal coupled to a common reference of the power converter, and wherein the output voltage is a negative voltage with respect to the common reference of the power converter; and
a diode coupled between the second winding and the common reference of the power converter such that a current flows through the second winding and the diode when the switch is in an OFF state.

15. The power converter of claim 13, further comprising a main inductor, wherein the first winding is a first portion of the main inductor and wherein the second winding is a second portion of the main inductor.

16. The power converter of claim 15, wherein the main inductor comprises a ferromagnetic core and wherein the first portion of the main inductor includes a first wire wound around the ferromagnetic core and wherein the second portion of the main inductor includes a second wire wound around the ferromagnetic core.

17. The power converter of claim 13, further comprising a sense circuit coupled to the feedback terminal of the controller, wherein the sense circuit generates the feedback voltage in response to the output voltage.

18. The power converter of claim 17, wherein sense circuit includes a resistor divider coupled to receive the output voltage.

19. The power converter of claim 13, wherein the output is a first output coupled to provide a first output voltage to a first load, the power converter further comprising a second output coupled between the second winding and the common reference of the power converter to provide a second output voltage to a second load, wherein the second output voltage is a negative voltage with respect to the common reference of the power converter.

20. The power converter of claim 13, wherein the second winding includes a tap element, and wherein the switch is coupled, through a diode, to the tap element of the second winding.

21. The power converter of claim 13, wherein the controller is coupled to control the switch to regulate the output voltage of the power converter in response to the feedback voltage received at the feedback terminal.

22. The power converter of claim 13, wherein the switch is a metal oxide field effect transistor (MOSFET) having a drain terminal coupled to the first terminal and a source terminal coupled to the second terminal of the integrated control circuit.

23. A non-isolated power converter, comprising:
an input to be coupled to a source of electrical energy;
an output to be coupled to a load;
a capacitor coupled across the output;
a first winding coupled to the input;
a second winding magnetically coupled to the first winding and electrically coupled to the output; and
a control circuit coupled between the first and second windings, wherein the control circuit includes:
a first terminal coupled to the first winding;
a second terminal coupled to the second winding;
a switch coupled between the first terminal and the second terminal of the control circuit, wherein a first current flows through the first winding and the switch when the switch is in an ON state, wherein at least a portion of the first current flows in the capacitor in a first direction;
a feedback terminal coupled to receive a feedback signal, wherein the control circuit is coupled to control the switch to regulate a flow of energy to the output of the power converter in response to the feedback signal;
wherein a second current flows through the second winding during a time when the switch is in an OFF state, wherein at least a portion of the second current flows in the capacitor in a second direction and wherein the second direction is opposite the first direction of the portion of the first current.

24. The power converter of claim 23, wherein the capacitor has one terminal coupled to the second terminal of the control circuit and another terminal coupled to a common reference of the power converter.

25. The power converter of claim 23, further comprising a main inductor, wherein the first winding is a first portion of the main inductor and wherein the second winding is a second portion of the main inductor.

26. The power converter of claim 25, wherein the main inductor comprises a ferromagnetic core and wherein the first portion of the main inductor includes a first wire wound around the ferromagnetic core and wherein the second portion of the main inductor includes a second wire wound around the ferromagnetic core.

27. The power converter of claim 23, further comprising a sense circuit coupled to the feedback terminal of the controller, wherein the sense circuit generates the feedback signal.

28. The power converter of claim 27, wherein sense circuit includes a resistor divider coupled to receive an output voltage.

29. The power converter of claim 23, wherein the switch is a metal oxide field effect transistor (MOSFET) having a drain terminal coupled to the first terminal and a source terminal coupled to the second terminal of the integrated control circuit.

* * * * *